(12) United States Patent
Shimozono et al.

(10) Patent No.: US 8,937,965 B2
(45) Date of Patent: Jan. 20, 2015

(54) STORAGE SYSTEM COMPRISING FUNCTION FOR MIGRATING VIRTUAL COMMUNICATION PORT ADDED TO PHYSICAL COMMUNICATION PORT

(75) Inventors: Norio Shimozono, Machida (JP); Shintaro Ito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 611 days.

(21) Appl. No.: 13/291,408

(22) Filed: Nov. 8, 2011

(65) Prior Publication Data

US 2012/0060010 A1 Mar. 8, 2012

Related U.S. Application Data

(63) Continuation of application No. 12/071,897, filed on Feb. 27, 2008, now Pat. No. 8,078,690.

(30) Foreign Application Priority Data

Dec. 13, 2007 (JP) .................................. 2007-321870

(51) Int. Cl.
*G01R 31/08* (2006.01)
*G06F 11/00* (2006.01)
*G08C 15/00* (2006.01)
(Continued)

(52) U.S. Cl.
CPC ........ *G06F 17/30067* (2013.01); *H04L 49/253* (2013.01); *G06F 17/30079* (2013.01); *G06F 17/3007* (2013.01); *H04L 49/50* (2013.01); *H04L 49/30* (2013.01); *H04Q 1/56* (2013.01); *H04L 49/70* (2013.01); *H04L 49/501* (2013.01)

USPC ........... 370/419; 370/216; 370/217; 370/218; 370/219; 370/235; 709/217; 709/218; 709/219; 709/220; 709/221; 711/147; 711/148; 711/149

(58) Field of Classification Search
CPC .......... G06F 17/30067; G06F 17/3007; G06F 17/30079; H04Q 1/56; H04L 49/253; H04L 49/30; H04L 49/50; H04L 49/501; H04L 49/70

See application file for complete search history.

(56) References Cited

U.S. PATENT DOCUMENTS

| 5,892,912 A | 4/1999 | Suzuki et al. |
| 6,292,836 B1 | 9/2001 | Teraoka |

(Continued)

FOREIGN PATENT DOCUMENTS

| JP | 2001-249853 A | 9/2001 |
| JP | 2004-227558 A | 8/2003 |

(Continued)

*Primary Examiner* — Hassan Phillips
*Assistant Examiner* — Lonnie Sweet
(74) *Attorney, Agent, or Firm* — Volpe and Koenig, P.C.

(57) ABSTRACT

A switch unit, which is connected to one or more computers and one or more storage systems, comprises an update function for updating transfer management information (a routing table, for example). The storage system has a function for adding a virtual port to a physical port. The storage system migrates the virtual port addition destination from a first physical port to a second physical port and transmits a request of a predetermined type which includes identification information on the virtual port of the migration target to the switch unit. The transfer management information is updated by the update function of the switch unit so that the transfer destination which corresponds with the migration target virtual port is the switch port connected to the second physical port.

4 Claims, 18 Drawing Sheets

(51) Int. Cl.
    *H04J 1/16*         (2006.01)
    *H04J 3/14*         (2006.01)
    *H04L 1/00*         (2006.01)
    *H04L 12/28*       (2006.01)
    *H04L 12/56*       (2006.01)
    *H04L 12/54*       (2013.01)
    *G06F 15/16*       (2006.01)
    *G06F 15/177*     (2006.01)
    *G06F 13/00*       (2006.01)
    *G06F 13/28*       (2006.01)
    *G06F 17/30*       (2006.01)
    *H04L 12/937*     (2013.01)
    *H04L 12/931*     (2013.01)
    *H04L 12/935*     (2013.01)
    *H04Q 1/56*        (2006.01)

(56) References Cited

U.S. PATENT DOCUMENTS

| | | | |
|---|---|---|---|
| 6,976,103 | B1 | 12/2005 | Watanabe et al. |
| 7,328,298 | B2 | 2/2008 | Kamakura et al. |
| 7,953,942 | B2 | 5/2011 | Innan et al. |
| 2002/0184529 | A1 | 12/2002 | Foster et al. |
| 2003/0041207 | A1 | 2/2003 | Kamakura et al. |
| 2005/0010688 | A1* | 1/2005 | Murakami et al. ............ 709/245 |
| 2005/0050256 | A1 | 3/2005 | Maki et al. |
| 2005/0050271 | A1 | 3/2005 | Honda et al. |
| 2006/0242356 | A1* | 10/2006 | Mogi et al. .................... 711/100 |
| 2006/0271758 | A1 | 11/2006 | Innan et al. |
| 2007/0055797 | A1 | 3/2007 | Shimozono |
| 2007/0130295 | A1* | 6/2007 | Rastogi et al. ................ 709/220 |
| 2007/0162721 | A1 | 7/2007 | Honda et al. |
| 2007/0260840 | A1 | 11/2007 | Watanabe |
| 2009/0150608 | A1 | 6/2009 | Innan et al. |
| 2010/0274963 | A1 | 10/2010 | Innan et al. |

FOREIGN PATENT DOCUMENTS

| | | |
|---|---|---|
| JP | 2005-202495 A | 1/2004 |
| JP | 2007-72571 A | 9/2005 |
| JP | 2006-330895 A | 12/2006 |
| WO | 01-63424 A1 | 8/2001 |

* cited by examiner

FIG. 5A

PHYSICAL PORT INFORMATION 600

| | |
|---|---|
| PHYSICAL PORT NUMBER | — 601 |
| PHYSICAL PORT WWN | — 602 |
| PHYSICAL PORT ID | — 603 |
| PHYSICAL PORT USAGE RATE | — 604 |

FIG. 5B

VIRTUAL PORT INFORMATION 700

| | |
|---|---|
| VIRTUAL PORT NUMBER | — 701 |
| PHYSICAL PORT NUMBER | — 702 |
| VIRTUAL PORT STATE | — 703 |
| VIRTUAL PORT WWN | — 704 |
| VIRTUAL PORT ID | — 705 |
| HOST PORT WWN | — 706 |
| HOST PORT ID | — 707 |
| LU PATH DEFINITION LIST | — 708 |
| VIRTUAL PORT USAGE RATE | — 709 |

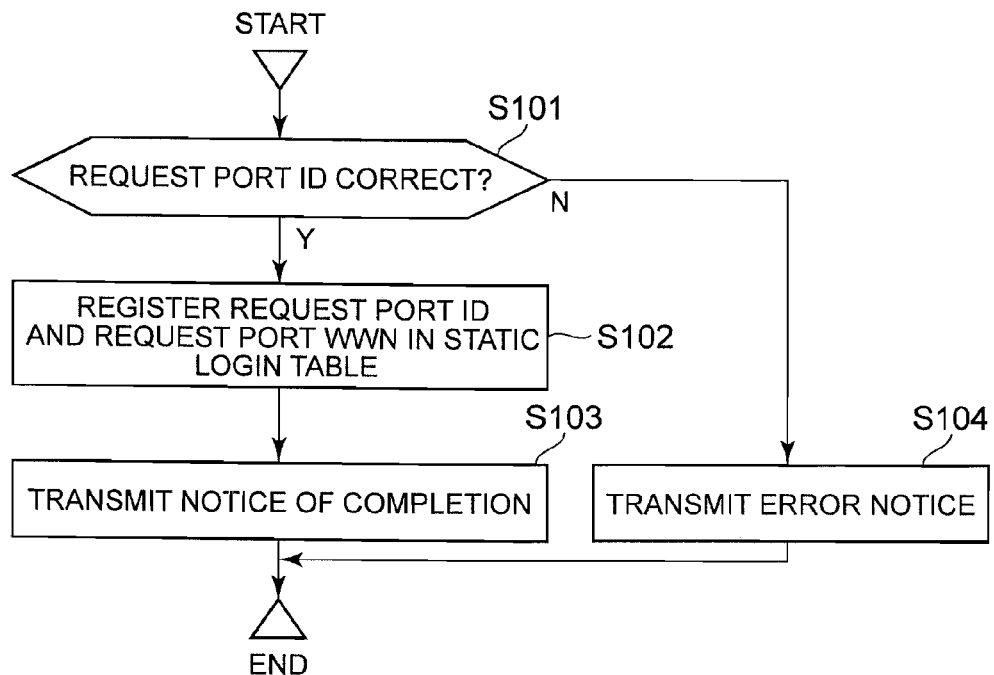
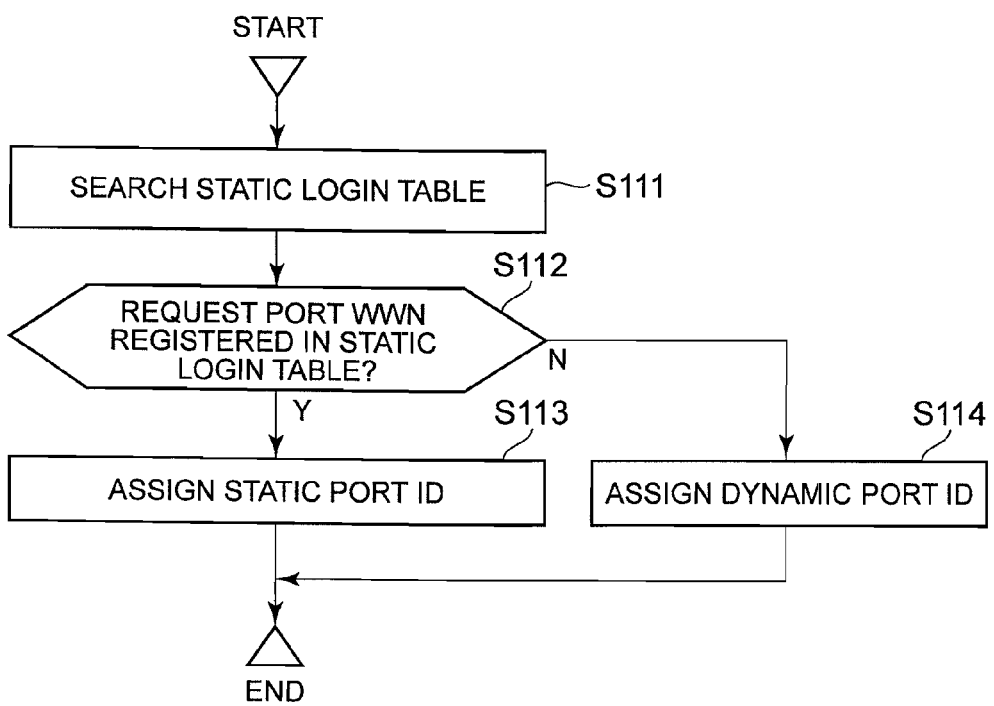

PAIR INFORMATION 800

FIG. 18

EXTERNALLY CONNECTED LDEV CONSTITUTION INFORMATION 1100

| |  |
|---|---|
| EXTERNALLY CONNECTED LDEV NUMBER | ~ 1101 |
| INITIATOR PORT ID | ~ 1102 |
| EXTERNAL STORAGE PORT ID | ~ 1103 |
| EXTERNAL STORAGE LUN | ~ 1104 |

STORAGE SYSTEM COMPRISING FUNCTION FOR MIGRATING VIRTUAL COMMUNICATION PORT ADDED TO PHYSICAL COMMUNICATION PORT

CROSS REFERENCE TO RELATED APPLICATIONS

This application is a continuation of U.S. patent application Ser. No. 12/071,897, filed Feb. 27, 2008, which claims the benefit of Japanese Patent Application No. 2007-321870, filed Dec. 13, 2007, which are incorporated by reference as if fully set forth herein.

BACKGROUND

The present invention generally relates to switching of the access path to a logical storage device in a storage system.

The technologies disclosed in Japanese Application Laid Open Nos. 2007-72571, 2005-202495, and 2004-227558, for example, are known as technologies relating to the switching of the access path to a logical storage device in a storage system.

According to Japanese Application Laid Open No. 2007-72571, an access path can be switched by changing both the multipath management software of the host and the storage path definition.

According to Japanese Application Laid Open No. 2005-202495, as a result of the migration destination storage system performing data migration from the migration source storage system after changing the host access destination port setting, migration with a host fault-tolerant system can be implemented.

According to Japanese Application Laid Open No. 2004-227558, a virtualization control device which is located between the host and the storage system is able to implement data migration and change the access destination device without changing the identification information with which the host identifies volumes.

According to Japanese Application Laid Open Nos. 2007-72571 and 2005-202495, the host is required to possess a function for changing the access path. The operation of changing the settings of the access path involves problems that differ for each OS (operating system) of the host.

According to Japanese Application Laid Open No. 2004-227558, there is no need for the host to possess a function for changing the access path. However, the virtualization control device is required to perform access path virtualization processing not only at the time of data migration but also during normal operation (when the host issues an access command to the storage system). Hence, in order to prevent a functional bottleneck, a high-performance virtualization processing circuit and processor must be installed.

SUMMARY

Therefore, an object of the present invention is implement computer fault-tolerant access path switching with which a computer need not be provided with an access path change function by means of a method that is different from a method that uses a virtualization control device that is disposed between the computer and the storage system.

Further objects of the present invention will become evident from the following description.

A switch unit which is connected to one or more computers (hosts, for example) and one or more storage systems comprises an update function for updating transfer management information (a routing table, for example). The storage system has a function for adding a virtual port to a physical port. The storage system migrates the virtual port addition destination from a first physical port to a second physical port and transits a request of a predetermined type which includes identification information on the virtual port of the migration target to the switch unit. The transfer management information is updated by the update function of the switch unit so that the transfer destination which corresponds with the migration target virtual port is the switch port which is connected to the second physical port.

BRIEF DESCRIPTION OF THE DRAWINGS

FIG. 5A shows the constitution of physical port information;
FIG. 5B shows the constitution of virtual port information;
FIG. 7 shows the flow of login table setting processing;
FIG. 8 shows the flow of login processing;
FIG. 18 shows the constitution of externally connected LDEV constitution information.

DETAILED DESCRIPTION OF THE PREFERRED EMBODIMENTS

Figure 1:
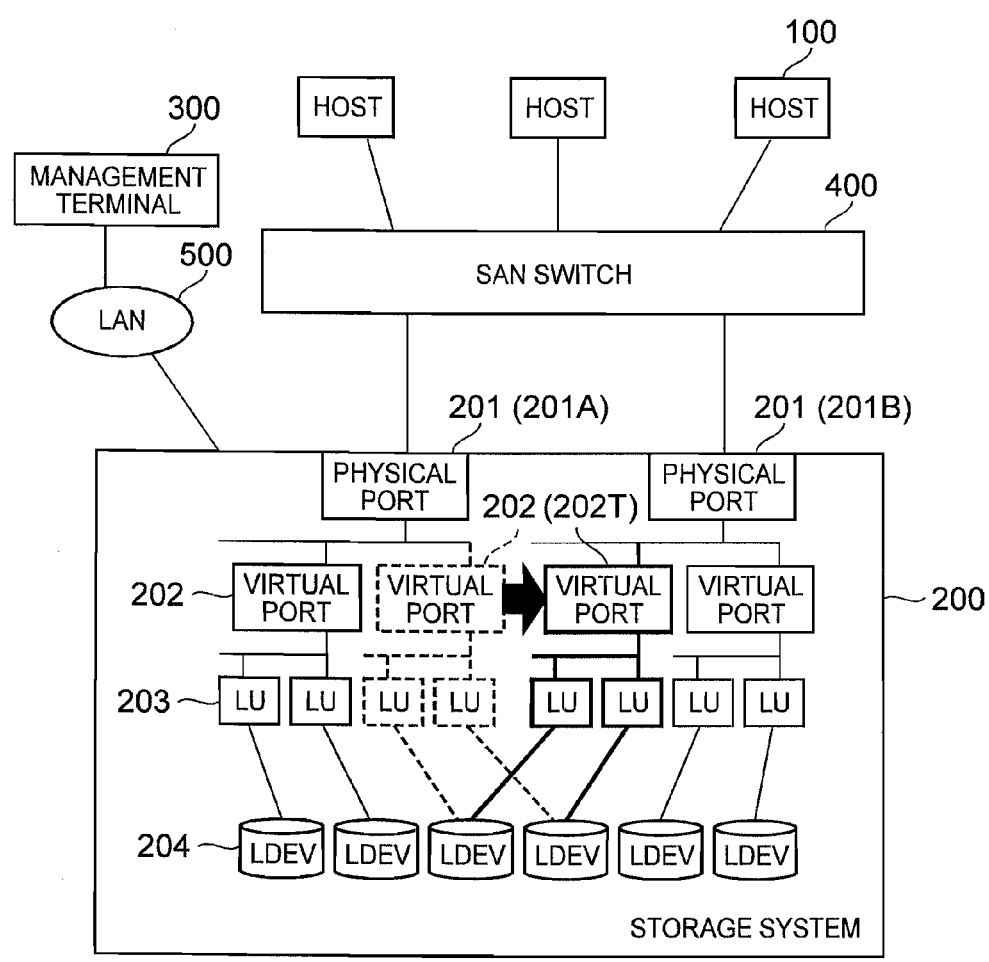
FIG. 1 shows the constitution of the computer system according to a first embodiment of the present invention.

In Embodiment 1, a storage system which is connected to a switch unit constituted by one or more switch devices comprises a plurality of logical storage devices; one or a plurality of physical ports constituting one or a plurality of physical communication ports; one or a plurality of virtual ports constituting one or a plurality of virtual communication ports; a virtual port migration section which migrates the addition destination of a migration target virtual port which has been added to the migration source physical port from the migration source physical port to the migration destination physical port; and a request issuing section which transmits a predetermined type of request which comprises port identification information on the migration target virtual port to the switch unit.

One or a plurality of virtual ports are added to each physical port. One or a plurality of logical storage devices are associated with each virtual port.

The switch unit comprises a plurality of switch ports which are a plurality of communication ports; transfer management information which comprises a plurality of combinations of destination port identification information and transfer destination information which represents the transfer destination that corresponds with the destination port identification information; a transfer processing section; and a transfer destination update section which updates the transfer management information. In cases where a frame comprising destination port identification information is received by a switch port, the transfer processing section specifies transfer destination information which corresponds with the destination port identification information which the received frame comprises by referencing the transfer management information and transmits the received frame from the switch port which corresponds with the transfer destination represented by the specified transfer destination information.

The plurality of switch ports include one or more switch ports which are connected to one or more computers that issue an access command frame having port identification information on the virtual port associated with the logical storage device and a plurality of switch ports which are connected to the plurality of physical ports which the one or more storage systems comprise.

In cases where the predetermined type of request is received, the transfer destination update section which the switch unit comprises updates the transfer destination information of the transfer management information which corresponds with the destination port identification information corresponding with the port identification information included in the predetermined type of request to information which represents the transfer destination corresponding with the switch port connected to the migration destination physical port.

Embodiment 2 is Embodiment 1, wherein the storage system is a migration source storage system which further comprises a virtual port cancellation section. The one or plurality of physical ports include the migration source physical port. The migration destination physical port is provided in a migration destination storage system. The virtual port migration section comprises a migration destination virtual port creation request section. The migration destination virtual port creation request section transmits a migration destination virtual port creation request which comprises virtual port identification information on the migration target virtual port and physical port identification information on the migration destination physical port to the migration destination storage system. The virtual port cancellation section cancels the migration target virtual port.

Embodiment 3 is Embodiment 2, wherein the predetermined type of request is a port switching request which comprises port identification information on the migration target virtual port and port identification information on the migration destination physical port. The request issuing section transmits the port switching request from the migration source physical port to the switch unit.

In Embodiment 4, the storage system according to Embodiment 2 or 3 comprises a command accumulation area in which received commands are accumulated; and a command transfer section. The command transfer section transfers a command which comprises the port identification information on the migration target virtual port among the commands that have been accumulated in the command accumulation area to the migration destination storage system.

Embodiment 5 is any of Embodiments 2 to 4, wherein the migration destination virtual port creation request section transmits information relating to a migration source logical storage device associated with the migration target virtual port to the migration destination storage system. Data in the migration source logical storage device are copied to the migration destination logical storage device that is associated, on the basis of the information relating to the migration source logical storage device, with a migration destination virtual port that has been added to the migration destination physical port.

In Embodiment 6 is any of Embodiments 2 to 4, wherein there is an external storage system which is connected to both the migration source storage system and the migration destination storage system. The migration source logical storage device associated with the migration target virtual port is a virtual logical storage device. The virtual logical storage device is associated with an external logical storage device which constitutes a logical storage device which the external storage system comprises. The migration destination virtual port creation request section transmits information relating to the migration source logical storage device and information relating to the external logical storage device which is associated with the migration source logical storage device to the migration destination storage system.

Embodiment 7 is Embodiment 1, wherein the storage system is a migration destination storage system. The one or plurality of physical ports include the migration destination physical port. The migration source physical port is provided in the migration source storage system. The virtual port migration section comprises a migration destination virtual port setting section. In response to the migration destination virtual port creation request from the migration source storage system, the migration destination virtual port setting section creates a migration destination virtual port which corresponds with the virtual port identification information in the migration destination virtual port creation request which is associated with the migration destination physical port that is identified from the physical port identification information in the migration destination virtual port creation request by associating the virtual port identification information in the migration destination virtual port creation request with the physical port identification information in the migration destination virtual port creation request. Embodiment 7 can be combined with Embodiment 2.

Embodiment 8 is Embodiment 7, wherein the predetermined type of request is a login request which comprises port identification information on the migration target virtual port. The request issuing section transmits the login request from the migration destination physical port to the switch unit.

In Embodiment 9, the storage system according to Embodiment 7 or 8 comprises a command accumulation area in which received commands are accumulated; an accumulation processing section, and a command processing section which processes the commands that have been accumulated in the command accumulation area. The accumulation processing section receives commands comprising port identification information on the migration target virtual port from the migration source storage system and accumulates the received commands in the command accumulation area. Embodiment 9 can be combined with Embodiment 4.

Embodiment 10 is any of Embodiments 7 to 9, wherein the migration destination virtual port setting section receives information relating to a migration source logical storage device which is associated with the migration target virtual port from the migration source storage system and associates the migration destination logical storage device with the migration destination virtual port added to the migration destination physical port on the basis of information relating to the migration source logical storage device. Data in the migration source logical storage device are copied to the migration destination logical storage device. Embodiment 10 can be combined with Embodiment 11.

Embodiment 11 is any of Embodiments 7 to 9, wherein there is an external storage system which is connected to both the migration source storage system and the migration destination storage system. The migration source logical storage device associated with the migration target virtual port is a virtual logical storage device which is associated with an external logical storage device which constitutes a logical storage device which the external storage system comprises. The migration destination virtual port setting section receives information relating to the migration source logical storage device and information relating to the external logical storage device which is associated with the migration source logical storage device from the migration destination storage system, associates the migration destination virtual logical storage device with a migration destination virtual port which has been added to the migration destination physical port on the basis of the information relating to the migration source logical storage device and the information relating to the external logical storage device, and associates the external logical storage device with which the migration source virtual logical storage device is associated with the migration destination virtual logical storage device. Embodiment 11 can be combined with Embodiment 5.

Embodiment 12 is Embodiment 1, wherein the plurality of physical ports include both the migration source physical port and the migration destination physical port.

Embodiment 13 is any of Embodiments 1 to 12, wherein the migration source physical port is a physical port for which the load exceeds a predetermined threshold value.

Embodiment 14 is any of Embodiments 1 to 13, wherein the virtual port is prepared for each of the computers.

In Embodiment 15, a computer system comprises a switch unit constituted by one or more switch devices; and one or more storage systems. The one or more storage systems comprise a plurality of logical storage devices, a plurality of physical ports constituting a plurality of physical communication ports, and a plurality of virtual ports constituting a plurality of virtual communication ports. One or a plurality of virtual ports are added to each physical port. One or a plurality of logical storage devices are associated with each virtual port. The switch unit comprises the plurality of switch ports, the transfer management information, the transfer processing section, and the transfer destination update section. The one or more storage systems comprise a virtual port migration section and a request issuing section. The virtual port migration section migrates the addition destination of a migration target virtual port which has been added to the migration source physical port among the plurality of physical ports from the migration source physical port to the migration destination physical port among the plurality of physical ports. The request issuing section transmits a predetermined type of request which comprises port identification information on the migration target virtual port to the switch unit.

Embodiment 16 is an access path switching method for switching an access path in a computer system in which one or more computers and one or more storage systems are connected to a switch unit which is constituted by one or more switch devices, comprising the steps of: migrating the addition destination of a migration target virtual port which has been added to the migration source physical port which the storage system comprises from the migration source physical port to the migration destination physical port which the storage system or another storage system comprises; transmitting a predetermined type of request which comprises port identification information on the migration target virtual port from the storage system or the other storage system to the switch unit; and, in cases where the switch unit has received the predetermined type of request, updating the transfer destination information of the transfer management information which corresponds with the destination port identification information corresponding with the port identification information included in the predetermined type of request to information which represents the transfer destination corresponding with the switch port connected to the migration destination physical port.

Embodiment 17 is a switch device to which one or more computers and one or more storage systems are connected, comprising: a plurality of switch ports which are a plurality of communication ports; transfer management information which comprises a plurality of combinations of destination port identification information and transfer destination information which represents the transfer destination that corresponds with the destination port identification information; a transfer processing section; and a transfer destination update section. In cases where a frame comprising destination port identification information is received by a switch port, the transfer processing section specifies transfer destination information which corresponds with the destination port identification information which the received frame comprises by referencing the transfer management information and transmits the received frame from the switch port which corresponds with the transfer destination represented by the specified transfer destination information. In cases where a predetermined type of request is received, the transfer destination update section updates the transfer destination information of the transfer management information which corresponds with the destination port identification information corresponding with the port identification information included in the predetermined type of request to information which represents the transfer destination corresponding with the switch port connected to the migration destination physical port. The migration destination physical port is a physical communication port which any storage system of the one or more storage systems comprises and is a communication port which constitutes the addition destination in place of the migration source physical communication port of the migration target virtual communication port that has been added to the migration source physical communication port which any storage system of the one or more storage systems comprises.

Each of the above parts (the virtual port migration section, request issuing section, transfer processing section, transfer destination update section, virtual port cancellation section, migration destination virtual port creation request section, command transfer section, transfer destination virtual port setting section, accumulation processing section, and command processing section) may also be referred to as "means" and can be constructed by hardware, a computer program, or a combination of hardware and a computer program (some parts are implemented by a computer program while the remainder are implemented by hardware, for example). The computer program is read to a predetermined processor and executed thereby. Further, the storage area which exists on the hardware resources such as memory may also be used. In addition, during the information processing in which the computer program is read to the processor and executed thereby, a storage area which exists on a hardware resource such as a memory may suitably be used. Further, the computer program may also be installed on the computer from a recording medium such as a CD-ROM or may be downloaded to the computer via a communication network.

A few embodiments of the present invention will be described in detail hereinbelow with reference to the drawings.

First Embodiment

FIG. 1 shows the constitution of the computer system according to the first embodiment of the present invention.

One SAN (Storage Area Network) switch 400 (or a plurality thereof) has a plurality of host computers 100 (or one thereof) and one storage system 200 connected thereto. Furthermore, a LAN (Local Area Network) 500 has a management terminal 300, one SAN switch 400 (or a plurality thereof), and a storage system 200 connected thereto. In place of the LAN 500, another type of communication network may also be adopted.

The host computer 100 is a computer device that comprises a CPU (Central Processing Unit) and a memory or other information processing resources and is constituted by a personal computer, a work station, or a mainframe or the like, for example. The host computer 100 transmits a command (a SCSI command, for example) such as an access command with information indicating the access destination LU (Logical Unit) to the storage system. Information representing the access destination LU includes the virtual port ID and the LUN (Logical Unit Number), for example.

The management terminal 300 is a computer device for managing a storage system and comprises a CPU and a memory or other information processing resources, for example.

The storage system can be a RAID system that comprises a multiplicity of physical storage devices which are arranged in the form of an array (called "PDEV" hereinbelow), for example. The storage system comprises a plurality of physical ports 201, a plurality of virtual ports 202, a plurality of LU (Logical Unit) 203, and a plurality of LDEV (Logical DEVice) 204.

The physical port 201 is a port to which a cable (an FC (Fibre Channel) cable, for example) is physically connected. As a result of this cable also being connected to the switch port of the SAN switch 400, the storage system 200 and SAN switch 400 are physically connected. The physical port 201 comprises a virtual port 202 as an additional port. More specifically, for example, a function for implementing an additional virtual port known as NPIV (N Port ID Virtualization) exists in the Fibre Channel and the storage system 200 is able to add one or a plurality of virtual ports 202 to one physical port 201 by using NPIV.

The virtual port 202 is a virtual port which is logically added to the physical port 201. The virtual port 202 can have one or a plurality of LU 203 associated therewith. In the first embodiment, the virtual port 202 is assigned to each host computer 100.

The LU 203 is a logical storage area which is designated by the host computer 100. The LU 203 can have an LDEV 204 associated therewith. More specifically, the combination of the virtual port ID and LUN and the LDEV number constitutes a definition of the path connecting the LU 203 and LDEV 204.

The LDEV 204 is a logical storage area which is formed on the basis of one or a plurality of PDEV storage spaces. The LDEV 204 is recognized by the storage system 200.

The SAN switch 400 is an FC (Fibre Channel) switch, for example, which is a device that executes a relay between the frames received from the host computers 100 and frames received from the storage systems. Here, a "frame" is a unit of received information. Information which is relayed by the SAN switch includes SCSI commands and messages and so forth. However, in the following description, information that is relayed by the SAN switch 400 is generally referred to as a "frame."

The respective physical ports 201 and virtual ports 202 have a SAN address for communicating via the SAN and a WWN (World Wide Name) for identifying the port. In the case of a Fibre Channel in particular, the SAN address is called the "port ID" (Port_ID) and the frame includes both the port ID of the transmission source port (the transmission source port ID) and the port ID of the transmission destination port (transmission destination port ID). The SAN switch relays the received frames on the basis of the transmission destination port ID.

In the first embodiment, the storage system 200 has a built-in virtual port migration function. The virtual port migration involves the addition of a virtual port 202T which has been added to a first physical port 201A to a second physical port 201B instead of the first physical port 201A. As a result of the virtual port migration, the section destination of the virtual port 202T constituting the migration target is updated from the first physical port 201A to the second physical port 201B. In FIG. 1, the dotted line represents the virtual port 202T before migration and the thick line represents the virtual port 202T after migration.

The virtual port 202T which constitutes the migration target may be any virtual port. However, in the first embodiment, for example, the virtual port 202T is any virtual port among a plurality of virtual ports that belong to virtual port 201A with an excessive load (the virtual port with the highest load among the plurality of virtual ports, for example). As a result, the load on the first physical port 201A can be alleviated. So that the load on the post-migration second physical port 201B resulting from the virtual port migration is not higher than the load on the pre-migration first physical port 201A, the second physical port 201B is desirably a lower load than the load on the pre-migration first physical port 201A even when a virtual port is newly added by the virtual port migration. The second physical port 201B may be designated by the administrator or the management terminal 300 or storage system 200 may be designated automatically.

Figure 2:
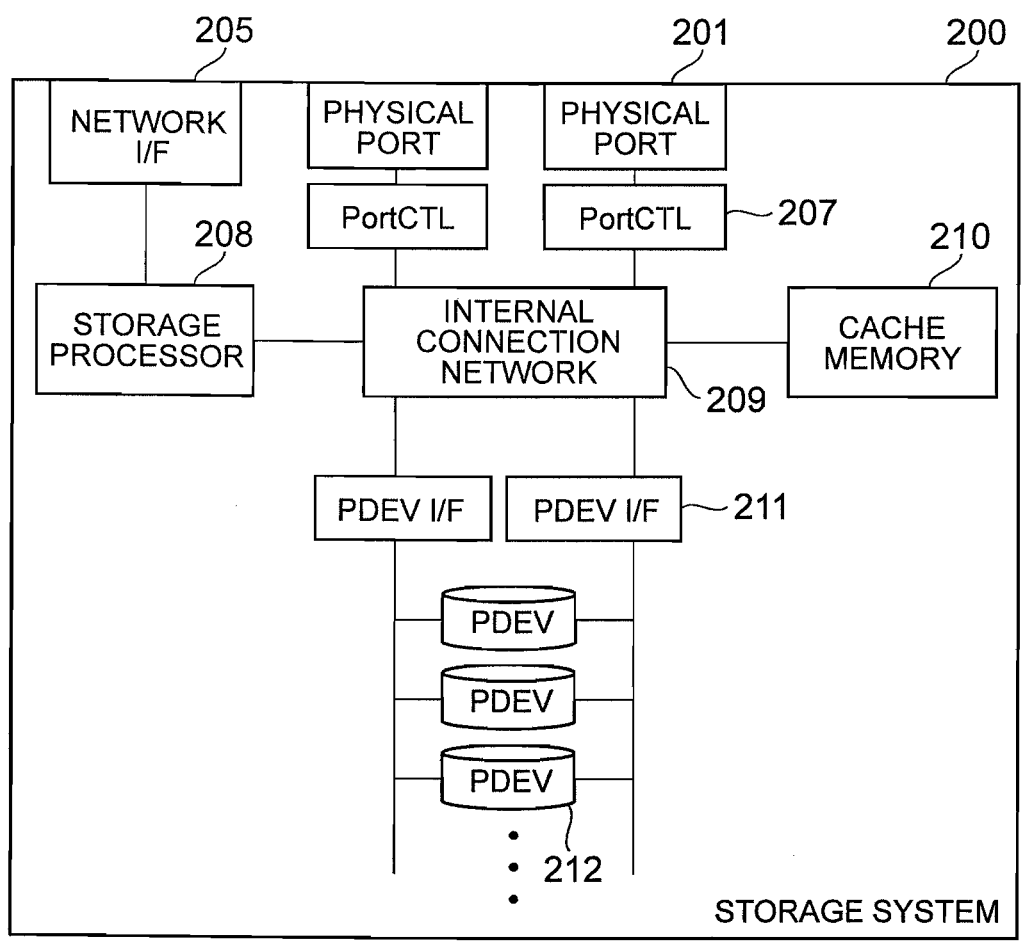
FIG. 2 shows the hardware constitution of the storage system.

FIG. 2 shows the hardware constitution of the storage system 200. In the following description, the interface is abbreviated as "I/F."

The storage system 200 comprises a plurality of physical ports (physical communication ports) 201, a plurality of port controllers (abbreviated as "PortCTL" in FIG. 2) 207, a plurality of PDEV 212, a plurality of PDEV I/F 211, an internal connection network 209, a cache memory 210, a storage processor 208, and a network I/F 205.

The port controller 207 is a device (a control circuit, for example) for controlling the protocol of the SAN (the Fibre Channel protocol, for example). The port controller 207 is prepared for each physical port 201. The port controller 207 reports the frame received by the physical port 201 from the host computer 100 (SCSI command, for example) to the storage processor 208 and receives an instruction from the storage processor 208, controls the data transfer between the host computer 100 and cache memory 210, and transmits frames to the host computer 100 (response, for example).

The network I/F 205 is an interface device for a connection with the management terminal 300 (a LAN card for communicating via an Ethernet (registered trademark, for example).

The cache memory 210 is an involatile memory for temporarily storing read target data which are read from the PDEV 212 and write target data which are received from the host computers 100 and written to the PDEV 212. The cache memory 210 is also able to store the storage control information (described subsequently), for example.

The storage processor 208 executes the software described with reference to FIG. 4 (computer program). The storage processor 208 is a microprocessor (CPU), for example.

The PDEV 212 is a hard disk drive, for example, but may also be another type of storage device such as a flash memory drive.

The PDEV I/F 211 is an interface device for accessing the PDEV 212. The writing of data to the PDEV and the reading of data from the PDEV is carried out via the PDEV I/F 211.

The respective port controllers 207, storage processor 208, cache memory 210, and respective PDEV I/F 211 are able to communicate via the internal connection network 209. A crossbar switch or a bus or the like can be adopted, for example, as the internal connection network 209.

Figure 3:
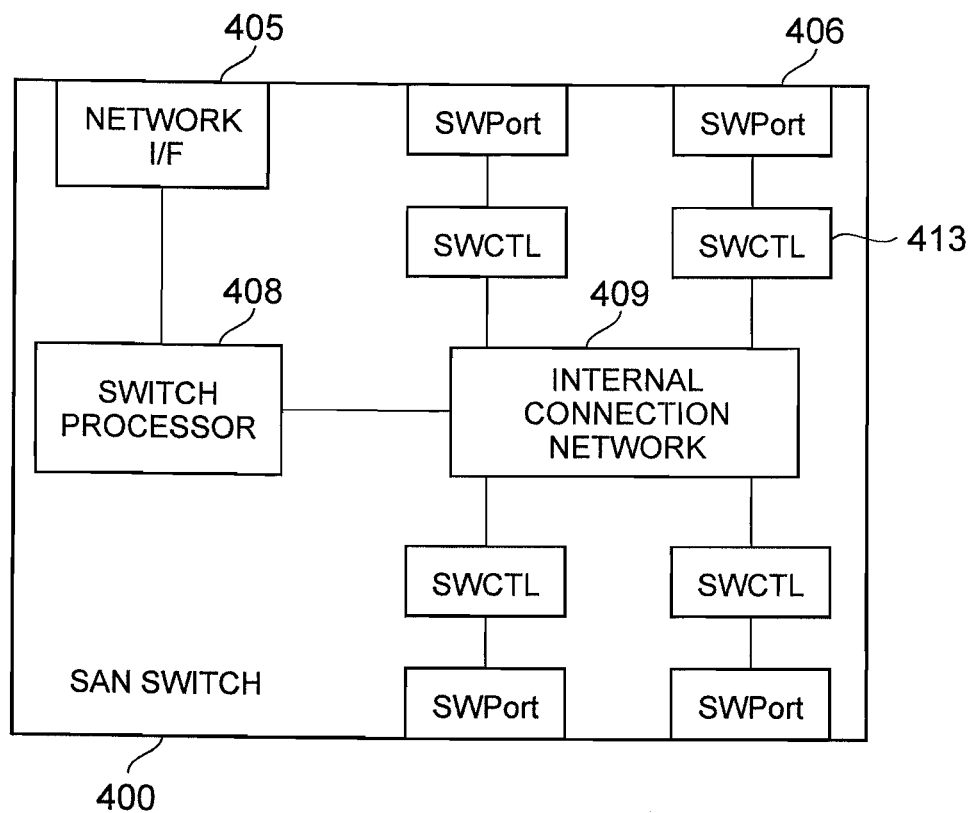
FIG. 3 shows the hardware constitution of a SAN switch.

FIG. 3 shows the hardware constitution of the SAN switch 400.

The SAN switch 400 comprises a plurality of switch ports (abbreviated as "SWPort" in FIG. 3) 406, a plurality of switch controllers (abbreviated as "SWCTL" in FIG. 3) 413, an internal connection network 409, a switch processor 408, and a network I/F 405.

The switch port 406 is a physical port that is connected to the SAN and is located in the SAN switch 400. In the first embodiment, the host computers 100 or storage system 200 are connected to the switch port 406 via a cable.

The internal connection network 409 has respective switch controllers 413 and switch processors 408 connected thereto. Communication between the switch controller 413 and between the switch controller 413 and switch processor 408 is carried out via the internal connection network 409. A crossbar switch or a bus or the like, for example, can be adopted as the internal connection network 409.

The switch controller 413 is a device (a control circuit, for example) for relaying frames which are received by the switch port 406 to another appropriate switch controller 413 or switch processor 408. The switch controller 413 determines the transfer destination switch controller 413 or switch processor 408 for the frame from the transmission destination port ID contained in the frame and the routing table (not shown) which the switch controller 413 comprises and transmits a frame to the determined switch controller 413 or switch processor 408.

The network I/F 405 is an interface device for establishing a connection with the management terminal 300 (a LAN card for communicating via an Ethernet, for example).

The switch processor 408 executes software (a computer program) which will be described with reference to FIG. 6A. The switch processor 408 is a microprocessor (CPU), for example.

Figure 4:
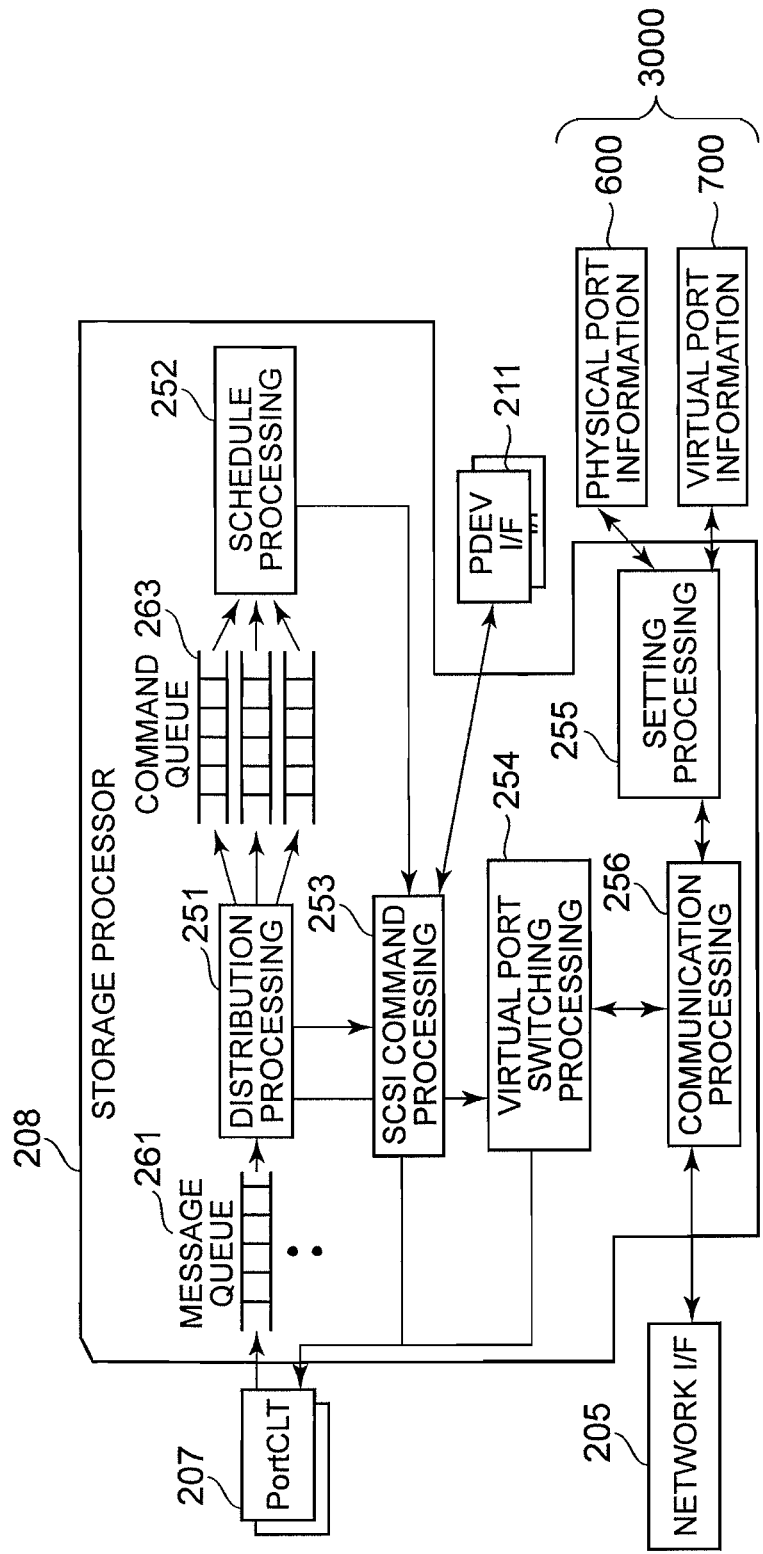
FIG. 4 shows the software constitution of the storage system.

FIG. 4 shows the software constitution of the storage system 200. In order to make the description easy to understand, the subject of the processing that is performed as a result of the storage processor 208 executing a program module will sometimes be the program module rather than the storage processor 208 hereinbelow.

The software that is executed by the storage processor 208 comprises a program module (called the "distribution processing module" hereinbelow) 251 for executing distribution processing, a program module (referred to as the "schedule processing module" hereinbelow) 252 for executing schedule processing, a program module (referred to as the "SCSI command processing module" hereinbelow) 253 for executing SCSI command processing, a program module (referred to as the "virtual port switching processing module" hereinbelow) 254 for executing virtual port switching processing, a program module (referred to as the "communication processing module" hereinbelow) 256 for executing communication processing, and a program module (referred to as the "setting processing module" hereinbelow) 255 for executing the setting processing. The storage processor 208 manages a message queue 261, a command queue 263 that is prepared for each virtual port 202, and storage control information 3000. At least one of the message queue 261, command queue 263, and storage control information 3000 may exist in the storage processor 208 or may exist in memory outside the storage processor 208.

The message queue 261 is a queue in which the frames received by the physical ports 201 are accumulated by the port controller 207.

The command queue 263 is a queue in which SCSI commands are accumulated by the distribution processing module 251.

The storage control information 3000 is information that is used to control the storage system. The storage control information 3000 includes physical port information 600 and virtual port information 700, for example.

In the distribution processing, the distribution processing module 251 executes the distribution of the frames that have been accumulated in the message queue 261. More specifically, in cases where the distribution target frame is a SCSI command, the distribution processing module 251 stores the frame in the command queue 263 which corresponds with the transmission destination port ID (virtual port ID) contained in the frame. However, in cases where the distribution target frame is a notice to the effect that a data transfer is complete, the distribution processing module 251 transmits the notice to the effect that the data transfer is complete to the SCSI command processing module 253.

In the schedule processing, the schedule processing module 252 reads the SCSI command from the command queue 263 in accordance with the virtual port information 700 and controls the startup of the SCSI command processing (startup with a round robin, for example). In specific terms, for example, if the virtual port state of a certain virtual port 202 is "normal," the schedule processing module 252 starts up the leading SCSI commands that have been accumulated in the command queue 263 corresponding with the certain virtual port 202 and, if the virtual port state of the certain virtual port 202 is "stopped," the schedule processing module 252 does not start up the leading SCSI command.

In the SCSI command processing, the SCSI command processing module 253 interprets the SCSI command that has started up, executes processing which corresponds with the SCSI command and transmits a response to the host computer 100 which constitutes the transmission source of the SCSI command. For example, if the SCSI command is an access command (a write command or read command), the SCSI command processing module 253 specifies the LDEV 204 which constitutes the access destination on the basis of the virtual port ID and LUN which the access command comprises and an LU path definition list (described subsequently) and accesses the specified LDEV 204 via the PDEV I/F 211.

In communication processing, the communication processing module 256 communicates with the management terminal 300 and performs the startup of the setting processing module 255 and the startup of the virtual port switching processing module 254.

In the virtual port switching processing, the virtual port switching processing module 254 transmits a request to change the routing table to the SAN switch 400 (more specifically, the port switching request or login request described subsequently).

In the setting processing, the setting processing module 255 references and updates the storage control information 3000.

FIG. 5A shows the constitution of the physical port information 600.

The physical port information 600 is information prepared for each of the physical ports 201. The information elements that are contained in the physical port information 600 include a physical port number 601, a physical port WWN 602, a physical port ID 603, and a physical port usage rate 604, for example. In the description of FIG. 5A, the physical port 201 which corresponds with the physical port information is called the "target physical port 201."

The physical port number 601 is a number that allows the target physical port 201 to be identified within the storage system.

The physical port WWN 602 is the WWN of the target physical port 201. The physical port WWN is fixed. The physical port WWN 602 is a value that is specific to the storage system and the physical port WWN 602 is calculated from the serial number and physical port number of the storage system when the power source of the storage system is turned ON, for example.

The physical port ID 603 is the address (Port_ID) of the SAN of the target physical port 201. The physical port ID 603 is information that is assigned by the SAN switch 400 as a result of transmitting a login request (a frame known as FLOGI (F_Port Login) of the Fibre Channel) to the SAN switch 400, for example. The SAN switch 400 stores the assigned port ID in a response frame to the FLOGI and transmits same to the storage system.

The physical port usage rate 604 is a ratio that represents, in relation to the maximum performance of the target physical port 201, to what extent same is being used. The physical port usage rate is measured at regular intervals (or at irregular intervals) by a program module (not shown) and the physical port usage rate thus measured is written over the physical port usage rate 604 in the physical port information.

FIG. 5B shows the constitution of the virtual port information 700.

The virtual port information 700 is information that is prepared for each virtual port 202. The information elements that are contained in the virtual port information 700 include, for example, a virtual port number 701, a physical port number 702, a virtual port state 703, a virtual port WWN 704, a virtual port ID 705, a host port WWN 706, a host port ID 707, an LU path definition list 708, and a virtual port usage rate 709. The virtual port 202 which corresponds with the virtual port information 700 is called the "target virtual port 202."

The virtual port number 701 is a number which serves to identify the target virtual port 202 in the storage system 200.

The physical port number 702 is the number of the physical port 201 to which the target virtual port 202 belongs.

The virtual port state 703 is a value that represents the state of the target virtual port 202 and values which can be adopted include, for example, "unused," "normal," and "stopped."

The virtual port WWN 704 is the WWN of the target virtual port. The virtual port WWN 704 is a value that is specific to the storage system and the virtual port WWN 704 is calculated from the serial number and physical port number of the storage system when the power source of the storage system is turned ON, for example.

The virtual port ID 705 is the address (Port_ID) in the SAN of the target virtual port 202. The virtual port ID 705 is information that is assigned by the SAN switch 400 as a result of transmitting a login request (a frame known as FDISC (Discover F_Port Service Parameters of the Fibre Channel) to the SAN switch 400, for example. The SAN switch 400 stores the port ID thus assigned in a response frame to the FDISC and transmits the port ID to the storage system. The function of the SAN switch 400 which uses the FDISC to assign a virtual port ID is called the NPIV.

The host port WWN 706 is the WWN of the port which the host computer 100 that has accessed the target virtual port 202 (that is, the host computer 100 corresponding with the virtual port 202) comprises. The host port WWN 706 is information that is reported by the host computer 100 when the host computer 100 logs onto the storage system 200.

The host port ID 707 is the address (Port_ID) of the SAN of the port that the host computer 100 which accessed the target virtual port 202 comprises. The host port ID 707 is also information that is reported by the host computer 100 when the host computer 100 logs onto the storage system 200.

The LU path definition list 708 is a list of definitions of the respective LU paths corresponding with the target virtual port 202. That is, in cases where a plurality of LU 203 are associated with the target virtual port 202, LU path definitions (a combination of LUN and LDEV numbers) for the respective LU 203 are recorded as a list in the LU path definition list 208.

The virtual port usage rate 709 is a ratio that indicates what proportion of the maximum performance of the physical port 201 to which the target virtual port 202 belongs is used by the target virtual port 202. The virtual port usage rate is measured by the program module (not shown) at regular intervals (or irregular intervals), for example, and the measured virtual port usage rate is written over the virtual port usage rate 709 of the virtual port information 700.

Figure 6A:
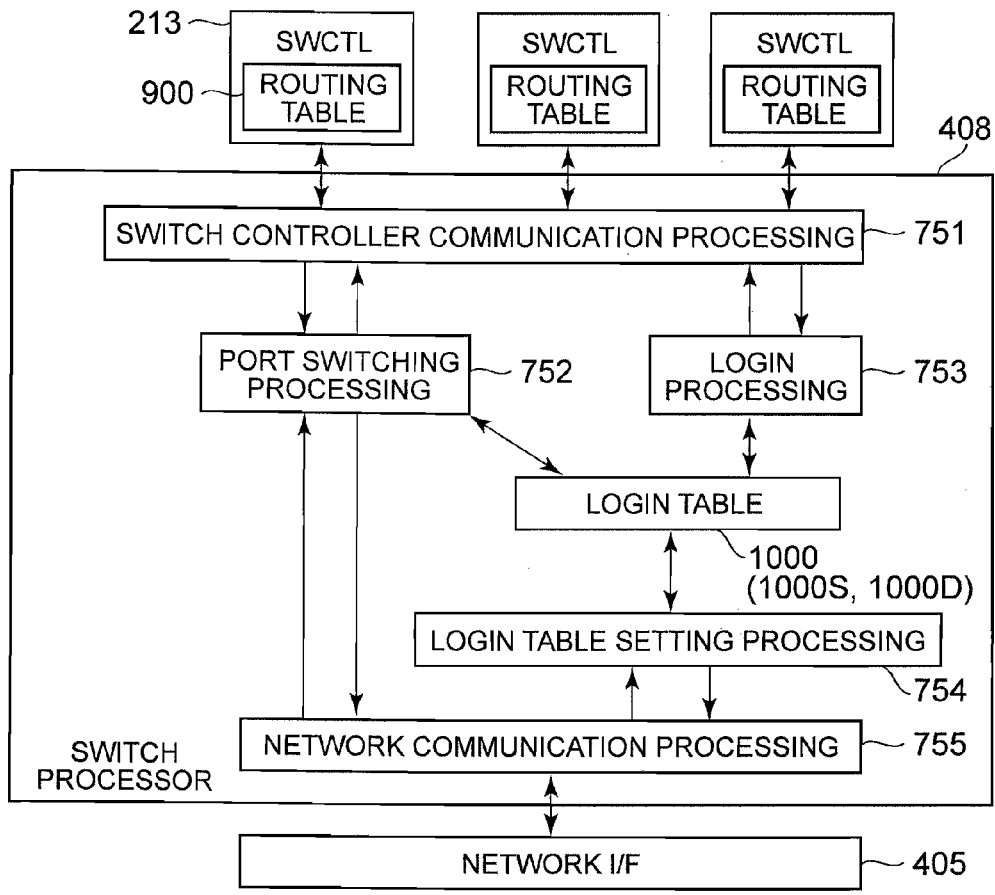
FIG. 6A shows the software constitution of the SAN switch.

FIG. 6A shows the software constitution of the SAN switch 400. In order to make the description easy to understand, the subject of the processing that is performed as a result of the switch processor 408 executing a program module will sometimes be the program module rather than the switch processor 408 hereinbelow.

The software that is executed by the switch processor 408 comprises a program module (called the "switch controller communication processing module" hereinbelow) 751 for executing the switch controller communication processing, a program module (referred to as the "port switching processing module" hereinbelow) 752 for executing port switching processing, a program module (referred to as the "login processing module" hereinbelow) 753 for executing login processing, a program module (referred to as the "login table setting processing module" hereinbelow) 754 for executing login table setting processing, and a program module (referred to as the "network communication processing module" hereinbelow) 755 for executing network communication processing. A routing table 900 is stored in the storage resource (not shown) of each switch controller 413. The switch processor 408 manages a login table 1000. The login table 1000 may exist in the switch processor 408 or may exist in a memory outside the switch processor 408.

Figure 6B:
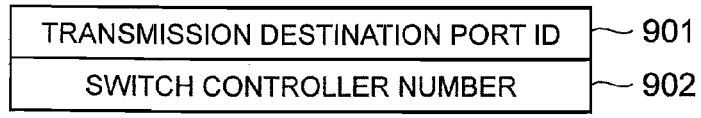
FIG. 6B shows the constitution of a routing table record.

FIG. 6B shows the constitution of one record of the routing table 900.

The routing table 900 is a table which indicates which switch controller 413 or switch processor 408 the frame is to be transferred to in cases where there is a particular transmission destination port ID in the frame. A set consisting of a transmission destination port ID 901 and a switch controller number 902, for example, is recorded in the respective records of the routing table 900. In cases where the transfer destination is the switch processor, the switch controller number 902 is the number that represents the switch processor.

In cases where a frame is received, the switch controller 413 specifies the switch controller number 902 which corresponds with the transmission destination port ID by referencing the routing table 900 which the switch controller 413 comprises, using the transmission destination port ID in the frame as the search key. In cases where the specified switch controller number 902 represents another switch controller 413, the switch controller 413 transfers the frame to the other switch controller 413 via the internal connection network 409 (not via the switch processor 408). However, in cases where the specified switch controller number 902 represents the switch processor 408, the switch controller 413 transfers the frame to the switch processor 408 via the internal connection network 409. In the first embodiment, in cases where the frame is an access command, for example, the frame comprises a transmission destination port ID (virtual port ID) which corresponds with the number that represents the switch controller 413. Furthermore, in cases where the frame is a port switching request and a login request, for example, the frame comprises the transmission destination port ID which corresponds with the number that represents the switch processor 408.

Figure 6C:
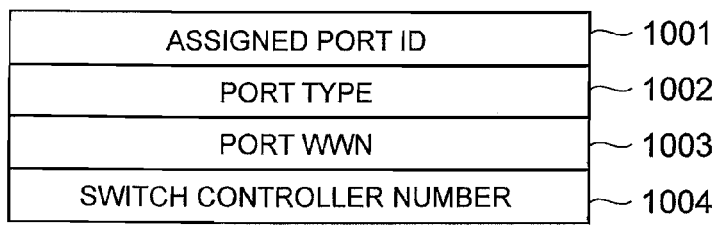
FIG. 6C shows the constitution of a login table record.

FIG. 6C shows the constitution of the record of the login table 1000. There are two types of login table 1000, namely a static login table 1000S and a dynamic login table 1000D. Both the respective records of table 1000S and 1000D have the constitution shown in FIG. 6C. Tables 1000S and 1000D are simply called the "login tables 1000" when a general term is used.

The login table 1000 is a table in which information relating to port 201 or 202 of the host computer 100 or storage system 200 which is connected to the SAN switch is recorded. An assigned port ID 1001, a port type 1002, a port WWN 1003, and a switch controller number 1004, for example, are recorded in the respective records of the login table 1000.

The assigned port ID 1001 is a port ID that is assigned to the port when logging on to the SAN switch (called the "login source port" hereinbelow). The login source port is the physical port 201 of host computer 100 or storage system 200.

The port type 1002 indicates the type of login source port. There are two types of values for the port type 1002, namely, "physical" and "virtual," for example.

Port WWN 1003 is the WWN of the login source port.

The switch controller number 1004 is the number of the switch controller which corresponds with the switch port that receives the login request from the login source port.

Please refer back to FIG. 6A.

In the switch controller communication processing, the switch controller communication processing module 751 receives a frame from the switch controller 413, interprets the received frame, and executes the processing on the basis of the result of the interpretation. For example, the switch controller communication processing module 751 calls the port switching processing module 752 in cases where the frame is a port switching request and calls the login processing module 753 in cases where the frame is a login request.

In the network communication processing, the network communication processing module 755 receives a frame from the management terminal 300, interprets the received frame, and executes processing based on the result of the interpretation. For example, the network communication processing module 755 calls the port switch processing module 752 in cases where the frame is a port switching request and calls the login table setting processing module 754 in cases where the frame is a login table setting request.

The login table setting processing, login processing, and port switching processing will be described hereinbelow with reference to FIGS. 7 to 9.

FIG. 7 shows the flow of the login table setting processing.

In cases where the management terminal 300 transmits a login table setting request after logging onto the SAN switch 400 via the LAN 500, the network communication processing module 755 receives the login table setting request and calls the login table setting processing module 754. As a result, the login table setting processing module 754 starts up. The login table setting request comprises a port WWN and a port ID. The port WWN and port ID in the login table setting request are referred to as the "requested port WWN" and "requested port ID" respectively in the description of FIG. 7.

In step 101, the login table setting processing module 754 judges whether the requested port ID is correct (in other words, whether the port ID is a port ID which can be registered in the static login table 1000S). In cases where the port ID is judged to be correct, step 102 is executed and, in cases where the port ID is judged to be incorrect, step 104 is executed. For example, in cases where the requested port ID is a port ID for the dynamic login table 1000D or a port ID which duplicates that of another SAN switch 400, the port ID is judged to be incorrect.

In step 102, the login table setting processing module 754 registers the requested port ID and the requested port WWN in the static login table 1000S. As a result, the requested port ID is registered as the assigned port ID 1001 and the requested port WWN is registered as the port WWN 1003.

In step 103, the login table setting processing module 754 sends a completion notice to the network communication processing module 755. As a result, the completion notice is sent from the network communication processing module 755 to the management terminal 300 via the network I/F 405.

In step 104, the login table setting processing module 754 sends an error notice to the network communication processing module 755. As a result, the error notice is sent from the network communication processing module 755 to the management terminal 300 via the network I/F 405.

FIG. 8 shows the flow of the login processing.

In cases where a login request is received from the transmission source port, the switch controller communication processing module 751 calls the login processing module 753. As a result, the login processing module 753 starts up. The transmission source port is the physical port (or virtual port) of the host computer 100 or the physical port 201 or virtual port 202 of the storage system. The login request comprises the port WWN and port type (information indicating whether transmission source port is a physical port or a virtual port). A login request is FLOGI or FDISC in the case of the Fibre Channel protocol, for example. In this case, the login request need not comprise the port type. This is because, by confirming whether the login request is FLOGI or FDISC, the SAN switch 400 is able to discriminate whether the transmission source port is a physical port or a virtual port. In the description of FIG. 8, the port WWN in the login request is known as the "requested port WWN." Further, in the description of FIG. 8, the port type in the login request or the port type discriminated from the login request is referred to as the "requested port type."

In step 111, the login processing module 753 searches the static login table 1000S using the requested port WWN as the search key.

In step 112, the login processing module 753 judges whether the requested port WWN has been registered in the static login table 1000S. If it is judged that the requested port WWN has been registered, step 113 is performed and, if it is judged that the requested port WWN has not been registered, step 114 is performed.

In step 113, static port ID assignment processing is performed. More specifically, the login processing module 753 registers the switch controller number of the switch controller 413 that received the login request from the transmission source port and the requested port type in the static login table 1000S. Furthermore, the login processing module 753 registers the switch controller number and the static port ID corresponding with the requested port WWN (the assigned port ID that has been registered in the static login table) in the routing tables 900 of all of the switch controllers 413. The login processing module 753 then sends back a login response comprising the static port ID to the switch controller communication processing module 751. As a result, a login response comprising the static port ID is transmitted from the switch controller communication processing module 751 to the transmission source port.

In step 114, dynamic port ID assignment processing is carried out. More specifically, the login processing module 753 calculates a port ID which does not duplicate an assigned port ID ("dynamic port ID" hereinbelow) by searching the respective dynamic login tables 1000D. Further, the login processing module 753 registers the requested port WWN, dynamic port ID, requested port type, and the switch controller number of the switch controller 413 that received the login request from the transmission source port in the dynamic login table 1000D. Further, the login processing module 753 registers the switch controller number and dynamic port ID in the routing tables 900 of all of the switch controllers 413. The login processing module 753 then sends back a login response comprising the dynamic port ID to the switch controller communication processing module 751. As a result, a login response comprising the dynamic port ID is transmitted from the switch controller communication processing module 751 to the transmission source port.

Figure 9:
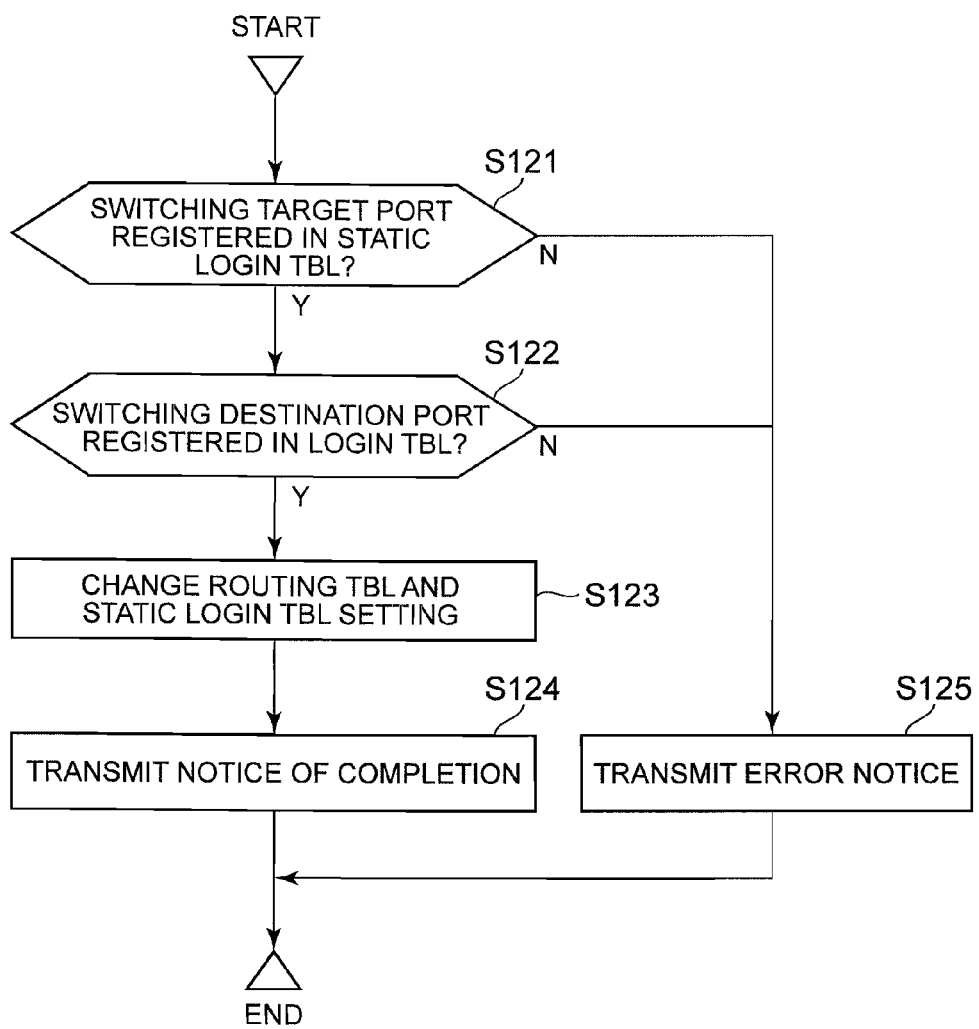
FIG. 9 shows the flow of port switching processing.

FIG. 9 shows the flow of the port switching processing.

The switch controller communication processing module 751 calls the port switching processing module 752 in cases where a port switching request transmitted from the transmission source port is received. Further, the network communication processing module 755 calls the port switching processing module 752 in cases where a port switching request is received from the management terminal 300. As a result, the port switching processing module 752 starts up. The port switching request comprises the WWN of the switching target port and the WWN of the switching destination physical port 201.

In step 121, the port switching processing module 752 judges whether the switching target port WWN has been registered in the static login table 1000S. If it is judged that the switching target port WWN has indeed been registered therein, step 122 is carried out and, if it is judged that the switching target port WWN has not been registered therein, step 125 is performed.

In step 122, the port switching processing module 752 judges whether the switching destination physical port WWN has been registered in either of the static login table 1000S or the dynamic login table 1000D. If it is judged that the switching destination physical port WWN has indeed been registered therein, step 123 is carried out and, if it is judged that the switching destination physical port WWN has not been registered therein, step 125 is performed.

In step 123, the port switching processing module 752 performs setting processing for the routing tables 900 and the static login table 1000S. More specifically, the port switching processing module 752 copies the switch controller number 1004 which corresponds with the switching destination physical port WWN registered in the login table 1000 to the entry area corresponding with the switching target port WWN of the static login table 1000S. The port switching processing module 752 then updates the switch controller number 902 of the port ID which corresponds with the switching target port WWN of all of the routing tables 900 to the switch controller number which corresponds with the switching destination physical port WWN. As a result, the switching target port-addressed frame is subsequently relayed to the switch controller 413 which corresponds with the switching destination physical port 201.

In step 124, the port switching processing module 752 transmits the completion notice to the call source program module (the switch controller communication processing module 751 or network communication processing module 755). As a result, the completion notice is transmitted from the call source program module 751 or 755 to the transmission source of the port switching request (the host computer 100 or storage system 200 or the management terminal 300 which comprises the transmission source port).

In step 125, the port switching processing module 752 transmits an error notice to the call source program module 751 or 755. As a result, the error notice is transmitted from the call source program module 751 or 755 to the transmission source of the port switching request.

Figure 10:
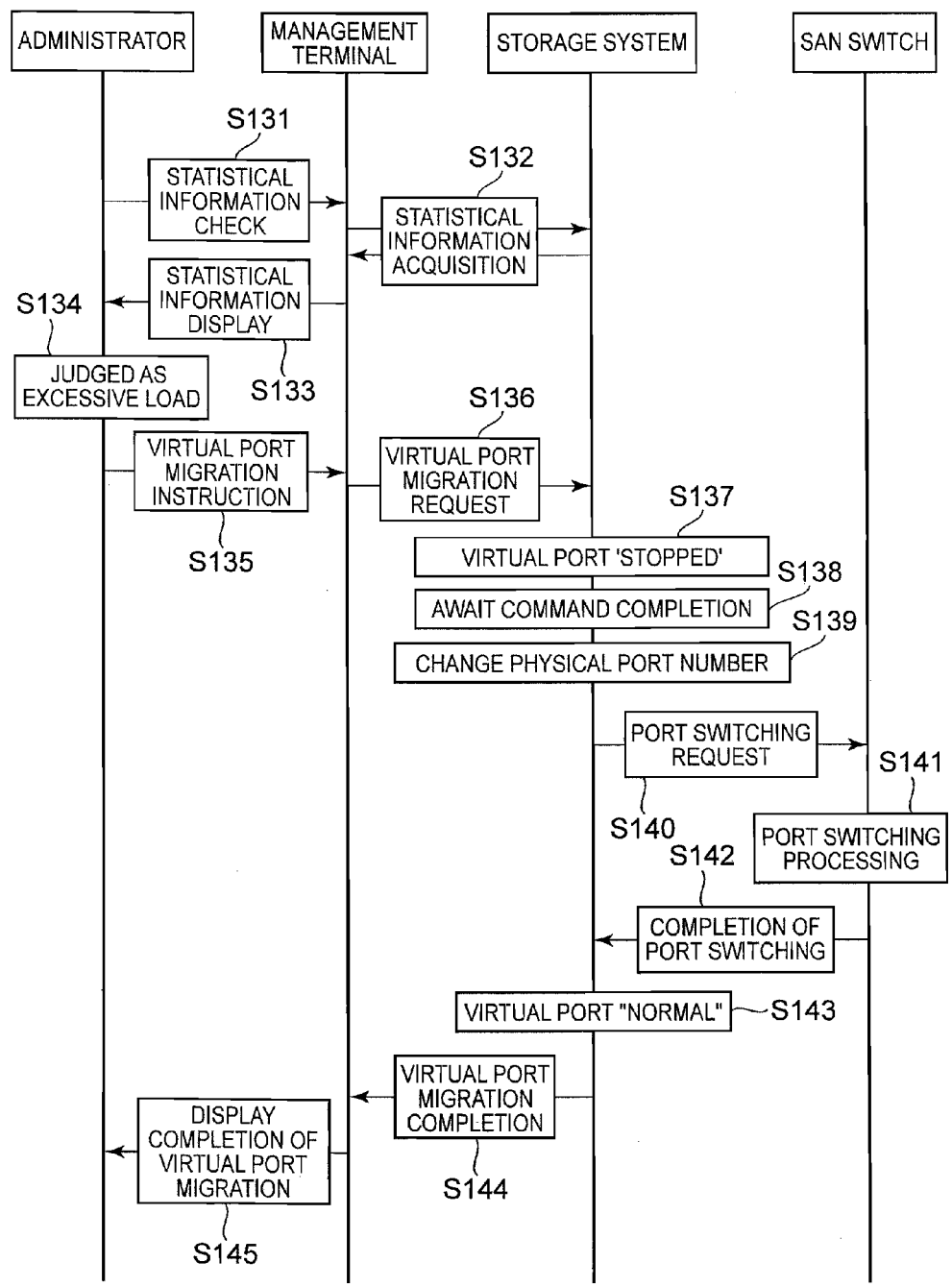
FIG. 10 shows the flow of processing that is executed by a computer system according to the first embodiment.

FIG. 10 shows the flow of the processing that is performed by the computer system according to the first embodiment.

In step 131, the administrator instructs the management terminal 300 to perform a port statistical information check. Here, a variety of information can be adopted as the port statistical information. However, in the first embodiment, the port statistical information is the physical port usage rate or virtual port usage rate.

In step 132, the management terminal 300 transmits a statistical information acquisition request to the storage system 200 in response to an instruction from the administrator. As a result, the storage system 200 transmits the physical port usage rate 604 of each physical port 201 and the virtual port usage rate 709 of each virtual port to the management terminal 300. Here, other types of identification information for uniquely specifying the physical ports 201 and virtual ports 202 such as the physical port number 601 of each physical port 201 and the virtual port number 701 of each virtual port is transmitted. Further, here, a set consisting of virtual port identification information (the virtual port number 701, for example) and physical port identification information (the physical port number 702, for example, is transmitted so that it is known which virtual port 202 has been added to which physical port 201 is transmitted.

In step 133, the management terminal 300 displays which virtual port 202 has been added to which physical port 201, the physical port usage rate of each physical port 201, and the virtual port usage rate of each virtual port on the basis of the information received from the storage system 200.

In step 134, the administrator judges the physical port 201 with an excessive load and the migration target virtual port 202. The excessive load physical port 201 is physical port 201 for which the predetermined physical port usage rate is exceeded, for example. The migration target virtual port is the virtual port 202 with the highest load among the plurality of virtual ports 202 that have been added to the excessive load physical port 201, for example.

In step 135, the administrator instructs the management terminal 300 to designate the migration target virtual port 202 and migrate the virtual port 202.

In step 136, the management terminal 300 transmits a migration request which comprises virtual port identification information (the virtual port number, for example) of the designated virtual port (the migration target virtual port) to the storage system 200. The migration request is sent to the virtual port switching processing module 254 in the storage system 200.

In step 137, the virtual port switching processing module 254 updates the virtual port state which corresponds with the virtual port identification information in the migration request (the virtual port state of the virtual port information in which the virtual port identification information is recorded) 703 to "stopped." As a result, the processing of the SCSI commands that have been accumulated in the command queue 263 which corresponds with the migration target virtual port 202T by the SCSI command processing module 253 is stopped. As a result, thereafter, in cases where the storage system 200 receives SCSI commands designating the LU 203 that are associated with the migration target virtual port 202T, the SCSI commands continue to be accumulated in the command queue 263 which corresponds with the migration target virtual port 202T.

In step 138, the virtual port switching processing module 254 awaits the completion of the SCSI command being processed. More specifically, the virtual port switching processing module 254 awaits the completion of the SCSI command processing so that the results of the SCSI command being processed by the SCSI command processing module 253 are not erroneous.

In step 139, the virtual port switching processing module 254 changes the physical port number 702 of the virtual port information 700 which corresponds with the migration target virtual port 202T to the physical port number of the migration destination physical port 201. For example, in step 135, the administrator may issue a designation of the migration destination physical port 201 to the management terminal 300 and the management terminal 300 may transmit a migration request which comprises the designated migration destination physical port number. Alternatively, in any of steps 137 to 139, the migration destination physical port 201 may also be automatically determined by the virtual port switching processing module 254. The migration destination physical port 201 that is designated by the administrator or automatically determined is a physical port 201 which will have a lower load than the load of the migration source physical port 201 even when the migration target virtual port 202T is added thereto, for example.

In step 140, the virtual port switching processing module 254 transmits a port switching request to the SAN switch 400. The port switching request comprises the WWN of the switching target virtual port (migration target virtual port) 202T and the WWN of the switching destination physical port (migration destination physical port) 201. The WWN of the switching target virtual port 202T is the virtual port WWN 704 acquired by the virtual port information 700 which corresponds with the switching target virtual port 202T. The WWN of the switching destination physical port 201 is the physical port WWN 602 acquired from the physical port information 600 which has the physical port number 702 in the virtual port information 700 which corresponds with the switching target virtual port 202T. The port switching request is transmitted from the physical port 201 to which the switching target virtual port 202T belongs, for example. The port switching request is sent to the port switching processing module 752 of the SAN switch 400.

In step 141, the port switching processing module 752 of the SAN switch 400 executes port switching processing in response to the port switching request. The details of the port switching processing are as provided with reference to FIG. 9. As a result, the switch controller number which corresponds with the port ID of the migration target virtual port 202T is changed to the number of the switch controller 413 of the switch port 406 connected to the migration destination physical port 201, in all of the routing tables 900 of the SAN switch 400.

In step 142, the virtual port switching processing module 254 receives notice of the completion of the port switching processing from the SAN switch 400.

In step 143, the virtual port switching processing module 254 updates the virtual port state 703 of the virtual port information 700 which corresponds with the migration target virtual port 202T to "normal." As a result, the processing by the SCSI command processing module 253 of the SCSI commands that have been accumulated in the command queue 263 which corresponds with the migration target virtual port 202T is restarted.

In step 144, the virtual port switching processing module 254 transmits notice of the completion of the virtual port switching processing. The completion notice is transmitted to the management terminal 300 via the communication processing module 256.

In step 145, the management terminal 300 receives the notice of the completion of the virtual port switching processing and displays the completion of the virtual port switching processing.

Figure 11:
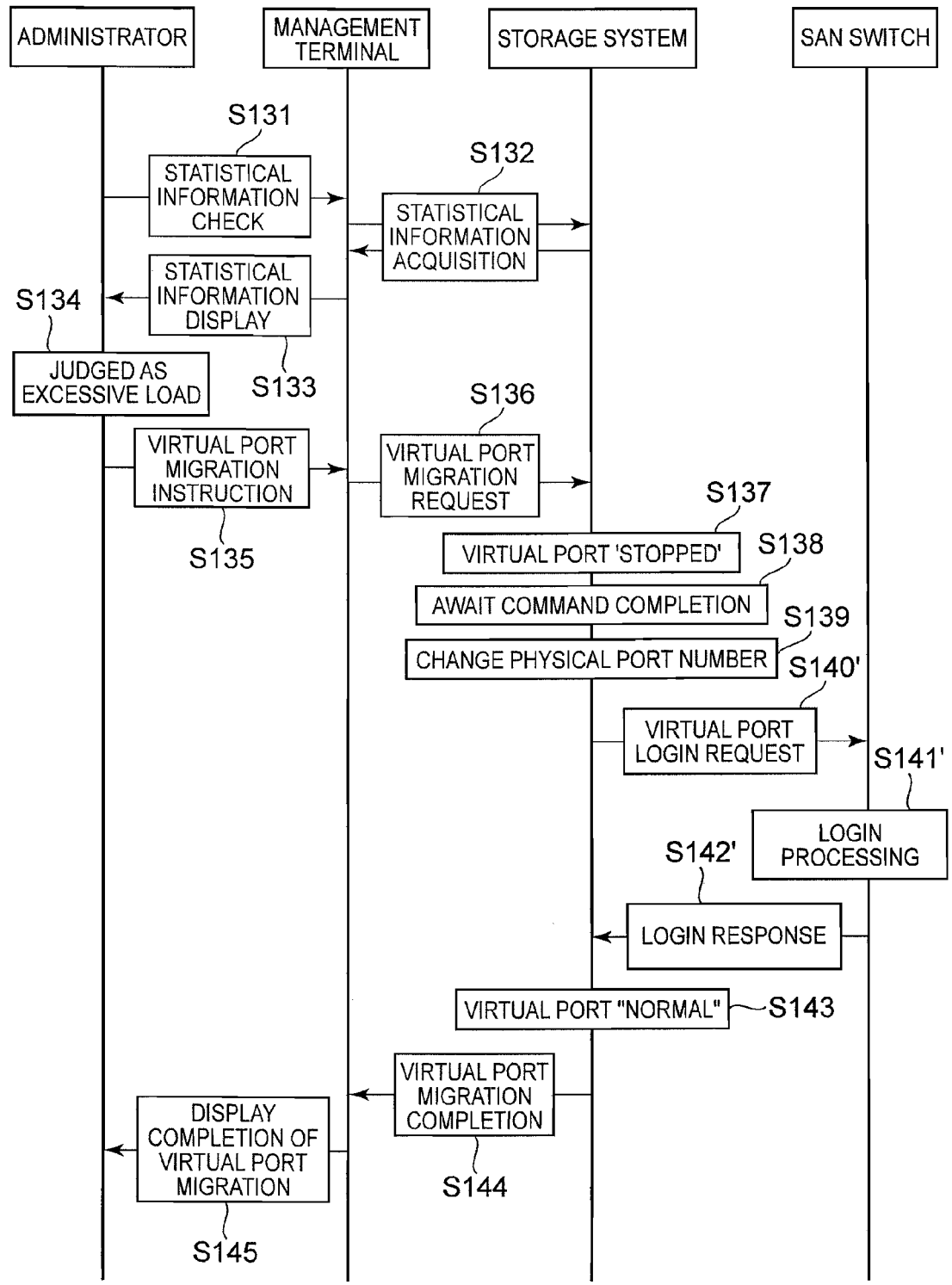
FIG. 11 shows a modified example of the flow of processing that is executed by a computer system according to the first embodiment.

FIG. 11 shows a modified example of the flow of the processing that is executed by the computer system according to the first embodiment. In FIG. 11, the same numbers are assigned to the same steps as FIG. 10.

According to the flow of the processing shown in FIG. 11, steps 140, 141, and 142 differ among the steps 131 to 145 shown in FIG. 10. More specifically, steps 140', 141', and 142' are adopted in FIG. 11 in place of steps 140, 141, and 142 in FIG. 10.

In step 140', the virtual port switching processing module 254 transmits a login request to the SAN switch 400. The login request comprises the virtual port WWN of the migration target virtual port 202T as the requested port WWN. The login request here is an FDISC frame, for example. The login request is transmitted to the migration destination physical port 201, for example. The login request is sent to the login processing module 253 of the SAN switch 400.

In step 141', the login processing module 253 executes login processing in response to the login request. The details of the login processing will be provided with reference to FIG. 8. Accordingly, the switch controller number 902 which corresponds with the port ID 901 of the migration target virtual port 202T in all of the routing tables 900 of the SAN switch 400 is changed to the number of the switch controller 413 of the switch port 406 which is connected to the migration destination physical port 201. This is because the login request was transmitted from the migration destination physical port 201 in step 140'.

In step 142', the virtual port switching processing module 254 receives notice the completion of the login processing from the SAN switch 400.

At least one of the few modified examples hereinbelow can be adopted for the flow of the respective processing described with reference to FIGS. 10 and 11.

As a first modified example, the computer program executed by the CPU in the management terminal 300 may acquire statistical information (the virtual port usage rate) for the respective virtual ports 202 and statistical information (the physical port usage rate) for the respective physical ports 201 at regular intervals. Furthermore, the computer program that is executed by the CPU in the management terminal 300 may automatically determine the excessive load physical port 201 and migration target virtual port 202 which belongs to the excessive load physical port 201. More specifically, for example, the computer program that is executed by the CPU in the management terminal 300 specifies a physical port 201 for which the physical port usage rate exceeds a predetermined threshold value and selects the virtual port 202 with the highest virtual port usage rate from the plurality of virtual ports 202 that belong to the specified physical port 201 as the migration target virtual port 202T. Furthermore, the computer program that is executed by the CPU in the management terminal 300 selects the physical port 201 with the lowest physical port usage rate as the migration destination physical port 201. The computer program then transmits a migration request which comprises the WWN of the migration target virtual port 202T and the WWN of the migration destination physical port 201 to the storage system 200.

As a second modified example, the storage processor 208 may also automatically determine the excessive load physical port 201 and the migration target virtual port 202T which belongs to the excessive load physical port 201. More specifically, for example, the storage processor 208 specifies a physical port 201 for which the physical port usage rate exceeds a predetermined threshold value. Further, the storage processor 208 selects the virtual port with the highest virtual port usage rate from a plurality of virtual ports 202 which belong to the specified physical port 201 as the migration target virtual port 202T. Furthermore, the storage processor 208 selects the physical port 201 with the lowest physical port usage rate as the migration destination physical port 201. Further, the port switching request or login request transmitted in step 140 or 140' comprises the WWN of the selected migration target virtual port (switching target virtual port) and the WWN of the migration destination physical port (switching destination physical port) 201.

As a third modified example, in step 137, the scheduler processing module 252 may revoke the SCSI commands that have been accumulated in the command queue 263 which corresponds with the migration target virtual port 202T. In cases where the host computer 100 is provided with an arrangement for detecting timeout and resending SCSI commands for which there has been no response, the command are resent to the migration destination virtual port as a result of this arrangement.

As a fourth modified example, the port switching request may also be transmitted from the management terminal 300.

A description of the first embodiment was provided hereinabove.

According to the first embodiment above, in cases where there is an excessive load physical port 201 in one storage system 200, the virtual port 202 which belongs to the excessive load physical port 201 can be migrated from the excessive load physical port 201 to another physical port 201 without stopping the host computer 100. Furthermore, when this action is implemented, the transfer destination information (more specifically, the switch controller number) which corresponds with the migration target physical port 201 (specifically, the port ID) is changed for the SAN switch 400.

Second Embodiment

A second embodiment of the present invention will be described hereinbelow. Here, the differences from the first embodiment will mainly be described and the description of the points in common with the first embodiment will be omitted or simplified.

Figure 12:
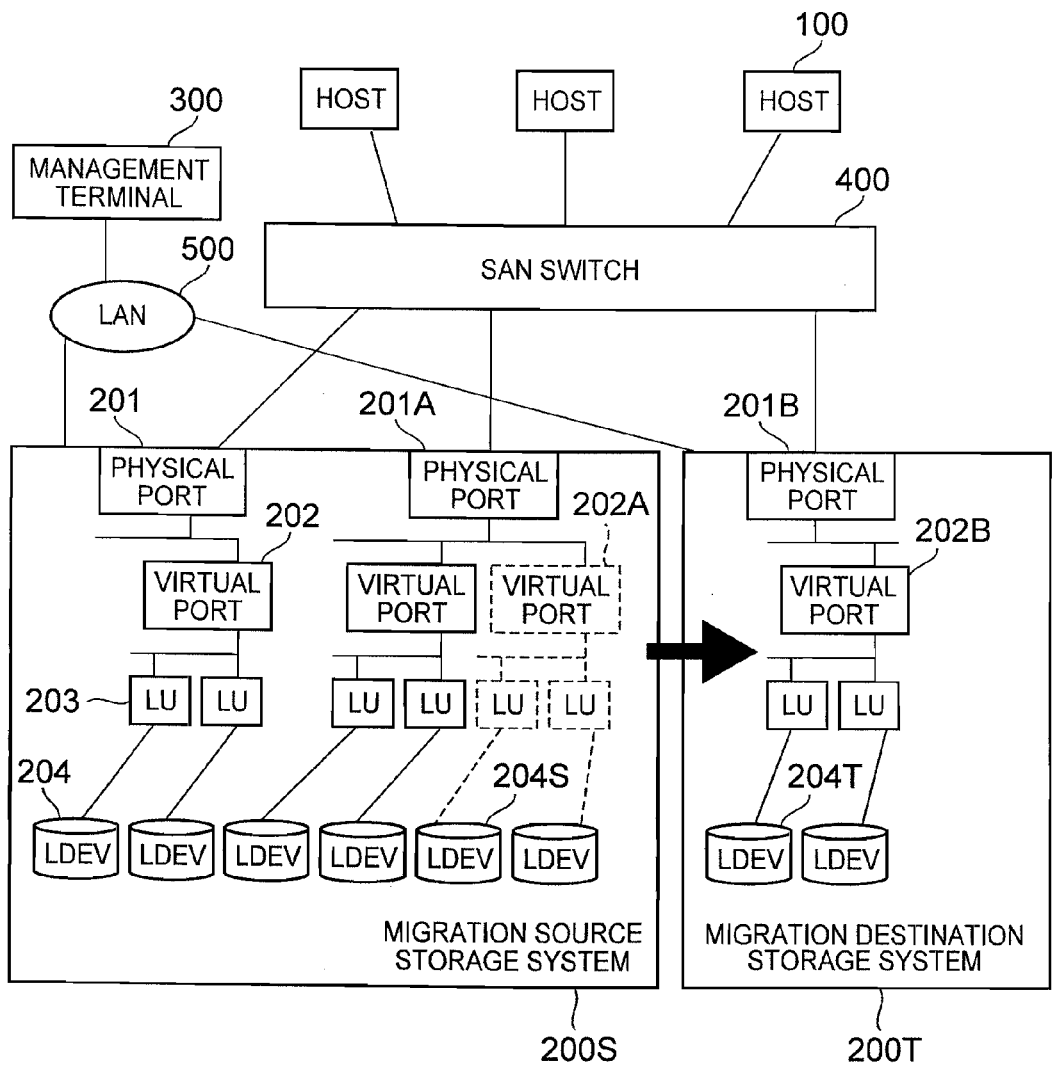
FIG. 12 shows the constitution of a computer system according to a second embodiment of the present invention.

FIG. 12 shows the constitution of the computer system according to the second embodiment of the present invention.

A plurality (two, for example) of storage systems are connected to the SAN switch 400 and LAN 500. One of the plurality of storage systems is a migration source storage system (the existing storage system, for example) 200S and the other one of the plurality of storage systems is a migration destination storage system (the added storage system, for example) 200T.

In the second embodiment, a migration target virtual port 202A and all of the LDEV which belong to the virtual port 202A (the LDEV which belongs to all of the LU path definitions which have the virtual port 202A) migrate from the migration source storage system 200S to the migration destination storage system 200T.

In this case, a path from the migration destination physical port 201B to the migration destination LDEV 204T is constructed in the migration destination storage system 200T. More specifically, the migration destination virtual port 202B is added to the migration destination physical port 201B, the LUN (LU203) which belongs to the migration target virtual port 202A is associated with the migration destination virtual port 202B, and the migration destination LDEV 204T is associated with each LUN. Further, data are copied from the migration source LDEV 204S of the migration source storage system 200S to the migration destination LDEV 204T of the migration destination storage system 200T via the migration source physical port 201A and the path thus constructed in the migration destination storage system 200T. In addition, the migration target virtual port 202A is eliminated in the migration source storage system 200S and the migration source LDEV (copy source LDEV) 204S is the unused LDEV. The unused LDEV can be added to the virtual port 202 of the migration source storage system 200S. That is, the spare capacity of the migration source storage system 200S increases in an amount equal to the capacity of the migration source LDEV 204S.

Figure 13:
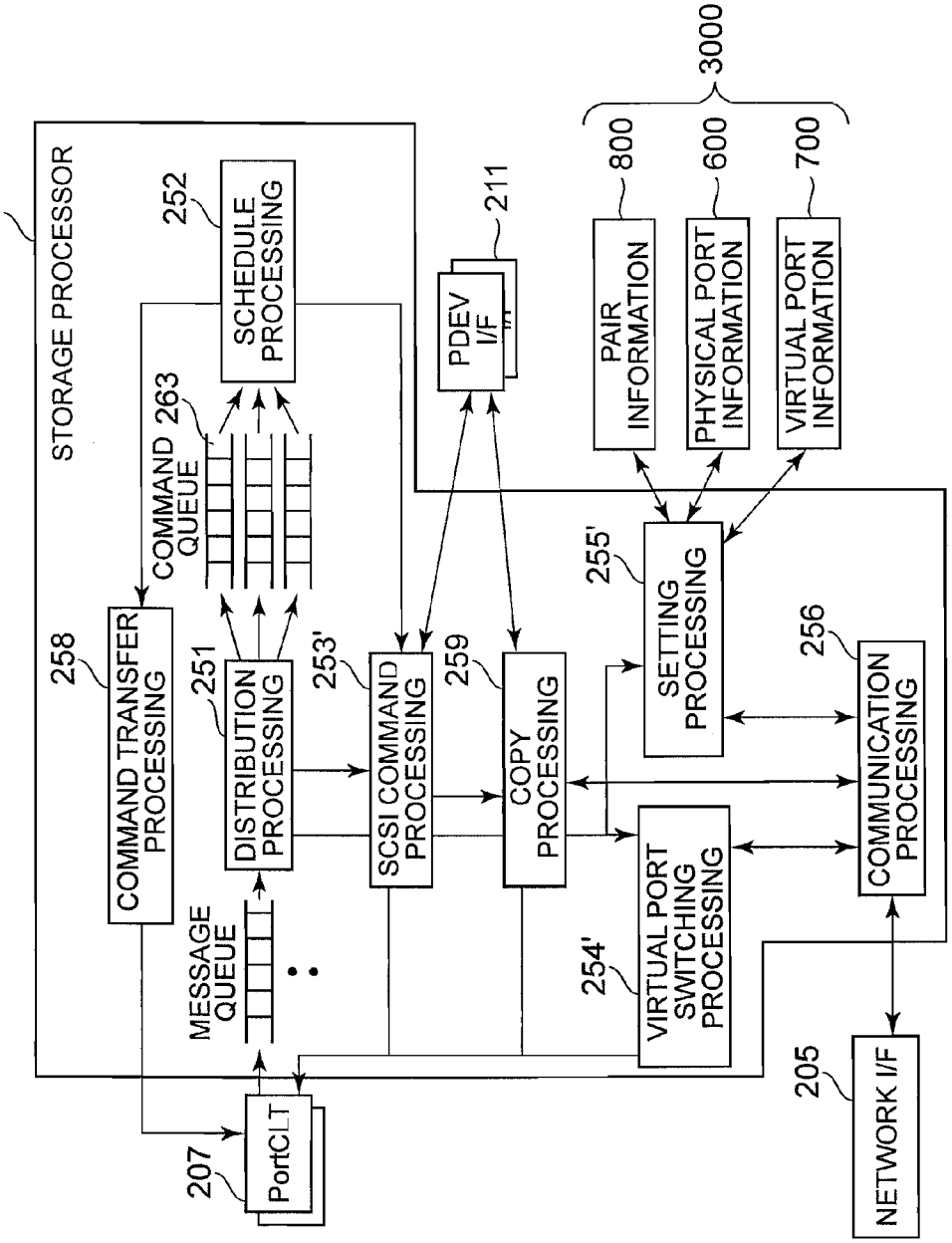
FIG. 13 shows the software constitution of the respective storage systems of the second embodiment.

FIG. 13 shows the software constitution of the respective storage systems 200S and 200T of the second embodiment.

In addition to the program modules described with reference to FIG. 4, a program module for executing the command transfer processing (called the "command transfer processing module" hereinbelow) 258 and a program module for executing copy processing (called the "copy processing module" hereinbelow) 259 are added.

The command transfer processing module 258 transfers of all of the SCSI commands that have been accumulated in the command queue 263 corresponding with the migration target virtual port 202A to the migration destination storage system 200T. In this case, the distribution processing module 251 of the migration destination storage system 200T accumulates the SCSI commands which correspond with the migration target virtual port 202A that have been transferred from the migration source storage system 200S to the command queue 263 which corresponds with the migration target virtual port 202T of the migration destination storage system 200T.

The copy processing module 259 copies the data that have been stored in the copy source LDEV (migration source LDEV) 204S (or, in addition, the data that have been written to the migration source LDEV 204S) to the copy destination LDEV (migration destination LDEV) 204T. For example, the copy processing module 259 is able to designate the write destination storage area (copy destination storage area) by including the port ID of the migration destination physical port 201B, an LDEV number, and an LBA (Logical Block Address) in the write request (copy request) which is transmitted to the migration destination storage system 200T.

The virtual port switching processing module 254' performs virtual port switching processing between the storage systems 200S and 200T in place of or in addition to the virtual port switching processing in the storage system 200.

The setting processing module 255' is able to start up not just as a result of a request from the network I/F 205 but also as a result of a request from another storage system 200S or 200T. The setting processing module 255' is able to reference and update the storage control information 3000 and send back information established in the storage control information 3000 to the other storage system 200S or 200T.

If, when processing a write command, pair information 800 which corresponds with the LDEV (copy source LDEV) 204S specified by the write command exists, the SCSI command processing module 253', write target data are also written to the copy destination LDEV 204T by calling the copy processing module 259. Further, in cases where the write command is a write command for a physical port 201, the SCSI command processing module 253' interprets the LUN designated by the write command as the LDEV number and writes the write target data to the LDEV specified by the LDEV number. This is an example of a method that designates the LDEV by using the LUN of the write command. In addition, the vendor may uniquely define a special write command and interpret the LUN as the LDEV number when such a write command is received.

The storage control information 300 includes pair information 800 in addition to the physical port information 600 and virtual port information 700.

Figure 14:
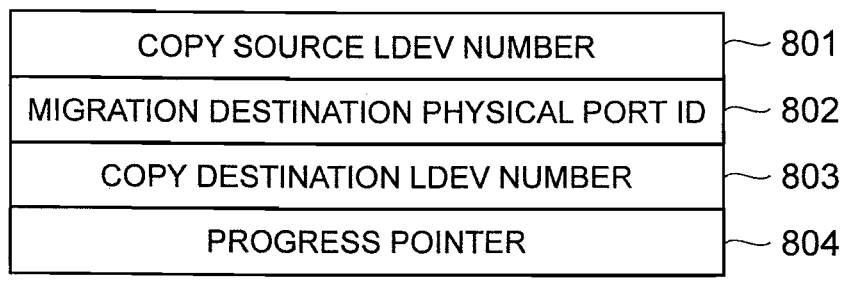
FIG. 14 shows the constitution of pair information.

FIG. 14 shows the constitution of the pair information 800.

The pair information 800 is prepared for each LDEV pair. The information elements which are contained in the pair information 800 include a copy pair LDEV number 801, a migration destination physical port ID 802, a copy destination LDEV number 803, and a progress pointer 804, for example.

The LDEV number is a number for identifying the LDEV within the storage system. The copy source LDEV number 801 is the number of the data copy source LDEV and the copy destination LDEV number 802 is the number of the data copy destination LDEV.

The migration destination physical port ID 803 is the port ID of the migration destination physical port 201B of the migration destination storage system 200T.

The progress pointer 804 is information indicating the copy progress. For example, when the copy to the end position of the copy source LDEV 204S is complete, this indicates the fact that the data stored in the copy source LDEV 204S and the data stored in the copy destination LDEV 204T are the same.

Figure 15:
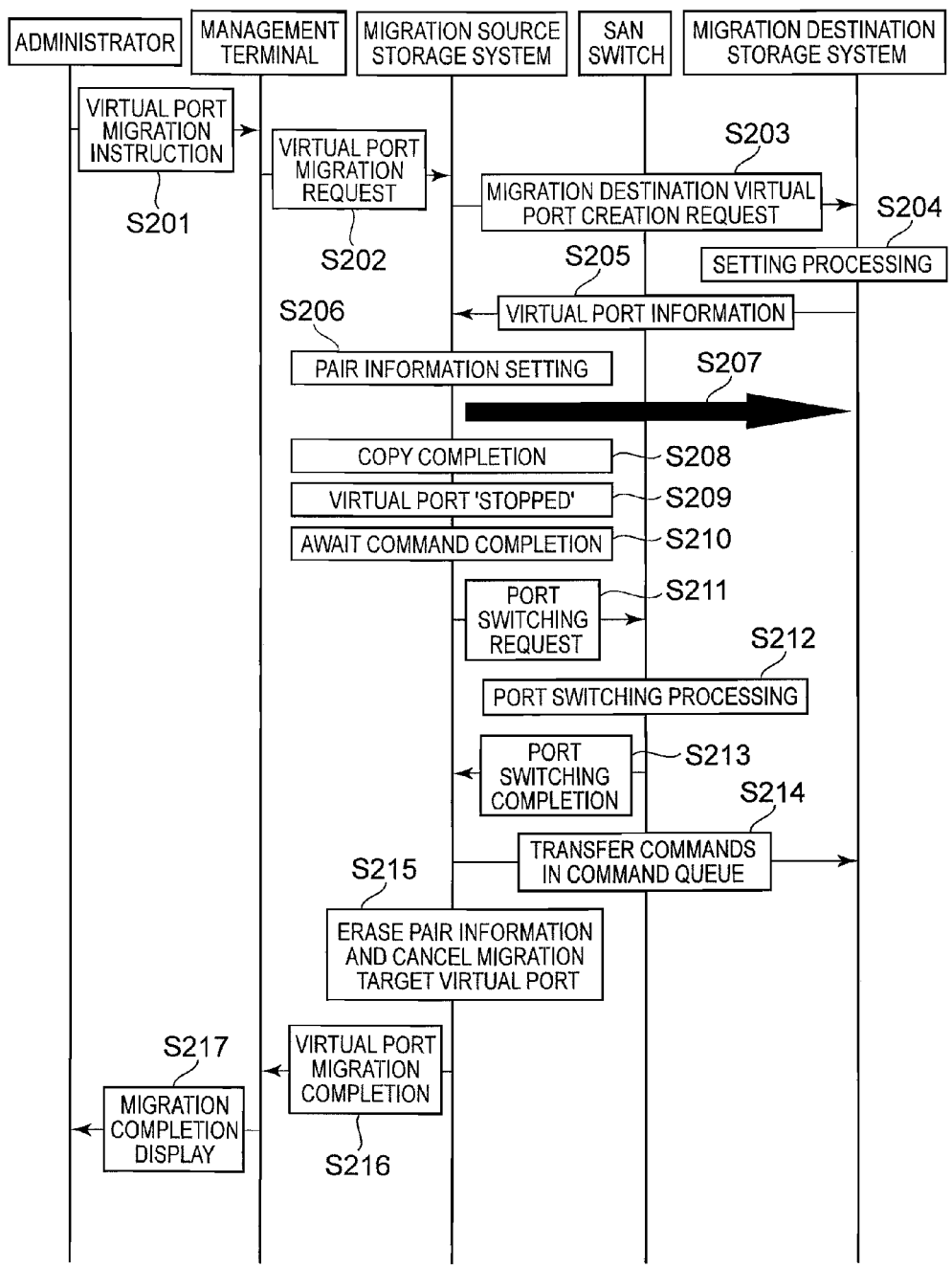
FIG. 15 shows the flow of processing that is executed by a computer system according to the second embodiment.

FIG. 15 shows the flow of the processing that is performed by the computer system according to the second embodiment.

In step 201, the administrator issues a designation of the migration target virtual port 202A to the management terminal 300 and issues a virtual port migration instruction thereto.

In step 202, the management terminal 300 transmits a migration request to the migration source storage system 200S. For example, the migration request contains the virtual port number of the migration target virtual port 202A, the physical port number of the migration destination physical port 201 of the migration destination storage system 200T, and the port ID of the migration destination physical port 201.

The information that is contained in the migration request is collected beforehand from the migration source storage system 200S, for example. The migration request is sent to the virtual port switching processing module 254' in the migration source storage system 200S.

In step 203, the virtual port switching processing module 254' of the migration source storage system 200S issues a request to the migration destination storage system to create a migration destination virtual port 202B. More specifically, for example, the virtual port switching processing module 254' transmits virtual port information 700 which corresponds with the migration target virtual port 202B and a setting request to the migration destination storage system 200T. The virtual port information 700 comprises the number 701 of the migration target virtual port 202A, the WWN 704 and port ID 705, the WWN 706 and the port ID 707 of the port of the host computer 100 which corresponds with the migration target virtual port 202T, the "normal" virtual port state 703, and the physical port number 702 of the migration destination physical port 201.

In step 204, in the migration destination storage system 200T, the setting processing module 255' sets the virtual port information 700 in the setting request from the migration source storage system 200S to the migration destination storage system 200T (the cache memory 210 therein, for example). Furthermore, here, the setting processing module 255' of the migration destination storage system 200T assigns the LDEV number of the unused LDEV in the migration destination storage system 200T to each LUN in the LU path definition list 708 in the set virtual port information 700. The unused LDEV which corresponds with the assigned LDEV number is the copy destination and is therefore an LDEV which has a storage capacity that is equal to or greater than the storage capacity of the copy source LDEV. As a result of the completion of step 204, a path from the migration destination physical port 201B to the migration destination LDEV 204T (the migration destination physical port 201B, migration destination virtual port 202B, the LUN and the migration destination LDEV 204T) is constructed.

In step 205, the setting processing module 255' of the migration destination storage system 200T sends back virtual port information 700 which corresponds with the migration destination virtual port 202B to the migration source storage system 200S. Thereupon, the physical port ID of the migration destination physical port 201 may also be sent back together with the virtual port information 700.

In step 206, the setting processing module 255' of the migration source storage system 200S sets the pair information 800 for each LDEV pair on the basis of the LU path definition list 708 of the virtual port information 700 from the migration destination storage system 200T. The pair information 800 thus set comprises the number of the LDEV which corresponds with the a certain target LUN that belongs to the migration target virtual port 202A as the copy source LDEV number 801 and comprises the migration destination physical port ID received from the migration destination storage system 200T as the migration destination physical port ID 802. In addition, the pair information 800 comprises the LDEV number assigned to the target LUN that is specified by the LU path definition list 708 in the virtual port information 700 from the migration destination storage system 200T as the copy destination LDEV number 803.

In step 207, the copy processing module 259 of the migration source storage system 200S performs a copy of data from each migration source LDEV 204S to each migration destination LDEV 204T on the basis of the pair information 800 which corresponds with all of the migration source LDEV 204S that belong to the migration target virtual port 202A. More specifically, the copy processing module 259 transmits a write command which takes the data of the migration source LDEV 204S as the write target (a write command which designates the migration destination LDEV 204T) to the migration destination storage system 200T. The copy processing module 259 updates the progress pointer 804 of the pair information 800 in accordance with the progress of the data copy. The data copy may also be executed as a result of the migration destination storage system 200T transmitting a read command designating the migration source LDEV 204S to the migration source storage system 200S and writing the data which are read in response to the read command to the migration destination LDEV 204T.

In step 208, the copying of data from each migration source LDEV 204S which belongs to the migration target virtual port 202A to each migration destination LDEV 204T ends.

In step 209, the virtual port switching processing module 254' changes the virtual port state 703 of the virtual port information 700 which corresponds with the migration target virtual port 202A to "stopped."

In step 210, the virtual port switching processing module 254' awaits the completion of the SCSI command being processed which corresponds with the migration target virtual port 202A.

In step 211, the virtual port switching processing module 254' transmits a port switching request from the migration source physical port 201A to which the switching target virtual port 202A belongs to the SAN switch 400. The port switching request comprises the WWN of the switching target virtual port (migration target virtual port) 202A and the WWN of the switching destination physical port (migration destination physical port) 201B.

In step 212, the port switching processing module 752 of the SAN switch 400 executes port switching processing in response to the port switching request. The details of the port switching processing are as provided with reference to FIG. 9.

In step 213, the virtual port switching processing module 254' receives notice of the completion of the port switching processing from the SAN switch 400.

In step 214, the command transfer processing module 258 transmits all of the SCSI commands that have been accumulated in the command queue 263 which corresponds with the migration target virtual port 202A to the migration destination storage system 200T. In the migration destination storage system 200T, the distribution processing module 251 accumulates the SCSI command from the migration source storage system 200S in the command queue 263 which corresponds with the migration destination virtual port 202B. The SCSI command processing module 253' of the migration destination storage system 200T is able to start the processing of the commands that have been accumulated in the command queue 263 which corresponds with the migration destination virtual port 202B from this point onward.

In step 215, the setting processing module 255' in the migration source storage system 200S cancels the pair information 800 set in step 206 and the migration target virtual port 202A of the migration source storage system 200S.

In step 216, the virtual port switching processing module 254' transmits notice of completion of the virtual port switching processing. The notice of completion is transmitted to the management terminal 300 via the communication processing module 256.

In step 217, the management terminal 300 receives the notice of the completion of the virtual port switching processing and displays the completion of the virtual port switching processing.

Figure 16:
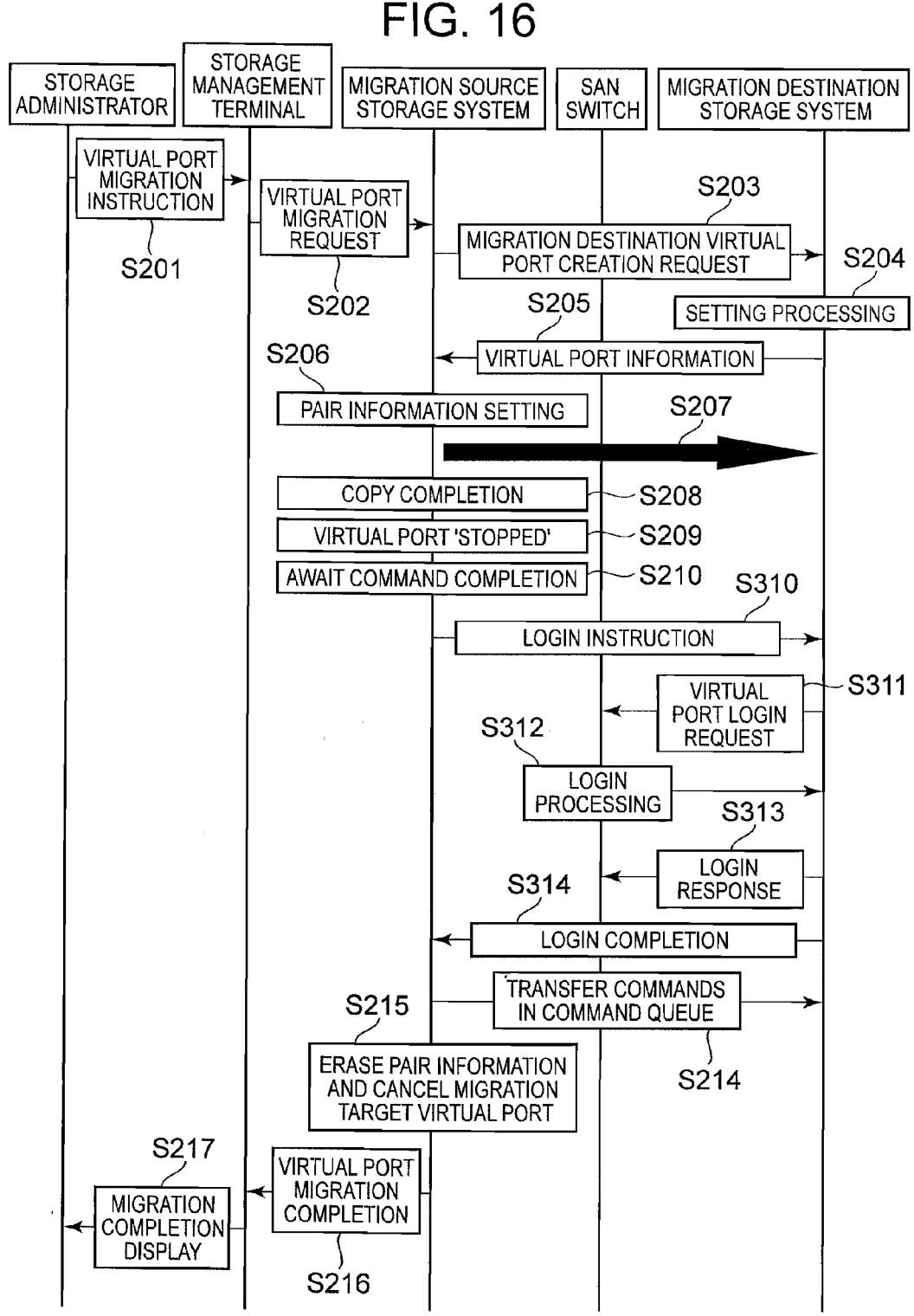
FIG. 16 shows a modified example of the flow of processing that is executed by a computer system according to the second embodiment.

FIG. 16 shows a modified example of the flow of processing that is executed by the computer system according to the second embodiment.

According to the flow of processing shown in FIG. 16, steps 211, 212, and 213 are different among steps 201 to 217 shown in FIG. 15. More specifically, steps 310, 311, 312, 313, and 314 are adopted in FIG. 16 in place of steps 211, 212, and 213 in FIG. 15.

In step 310, the virtual port switching processing module 254' in the migration source storage system 200S transmits a login instruction to the migration destination storage system 200T. The login instruction comprises the virtual port WWN of the migration target virtual port 202A.

In step 311, the virtual port switching processing module 254' in the migration destination storage system 200T transmits a login request to the SAN switch 400 in response to the login instruction from the migration source storage system 200S. The login request comprises a virtual port WWN of the migration target virtual port 202A as the request port WWN. The login request here is an FDISC frame, for example. The login request is transmitted from the migration destination physical port 201B, for example. The login request is sent to the login processing module 753 of the SAN switch 400.

In step 312, the login processing module 753 executes the login processing in response to the login request. The details of the login processing are as provided with reference to FIG. 8.

In step 313, the virtual port switching processing module 254' of the migration destination storage system 200T receives a login processing completion notice from the SAN switch 400.

In step 314, the virtual port switching processing module 254' of the migration destination storage system 200T reports login completion to the migration destination storage system 200T.

At least one of the few modified examples below can be adopted for the flow of the respective processing described with reference to FIGS. 15 to 16.

As a first modified example, in cases where the storage system is newly expanded to the SAN switch 400, the SAN switch 400 and the migration source storage system 200S, via the SAN switch 400, are able to detect the expansion of the storage system. In response to the fact that the storage system has been newly expanded to the SAN switch 400, the migration source storage system 200S may shift all (or some) of the virtual ports 202 from the migration source storage system 200S to the expanded storage system.

As a second modified example, the LDEV 204S which constitutes the migration source may also be designated instead of the virtual port 202. In this case, the virtual port 202 to which the designated LDEV 204S belongs can be the migration target virtual port 202A.

As a third modified example, the migration target virtual port 202A may also be a virtual port that belongs to the excessive load physical port as per the first embodiment. Furthermore, for this reason, the acquisition of statistical information may also be performed as per the first embodiment. In addition, the excessive load physical port or the virtual port which constitutes the migration target among the one or more virtual ports that belong to the excessive load physical port may also be determined automatically by the management terminal 300 or the migration source storage system 200S.

The second embodiment was described hereinabove.

According to the second embodiment, a virtual port 202 and all of the LDEV which belong to the virtual port 202 (the LDEV which belong to all of the LU path definitions which have the virtual port) migrate from the migration source storage system 200S to the migration destination storage system 200T. Accordingly, the load on the migration source storage system 200S (specifically, the load on the physical port 201A to which the migration target virtual port 202A belongs and the load on the storage processor 208' of the migration source storage system 200S) can be alleviated. Furthermore, the shift in the virtual port 202 and LDEV 204 across the storage systems 200S and 200T can be performed without stopping the host computer 100.

Third Embodiment

The third embodiment of the present invention will be described hereinbelow. Here, the differences from the second embodiment will mainly be described and the points in common with the second embodiment will be omitted or simplified.

Figure 17:
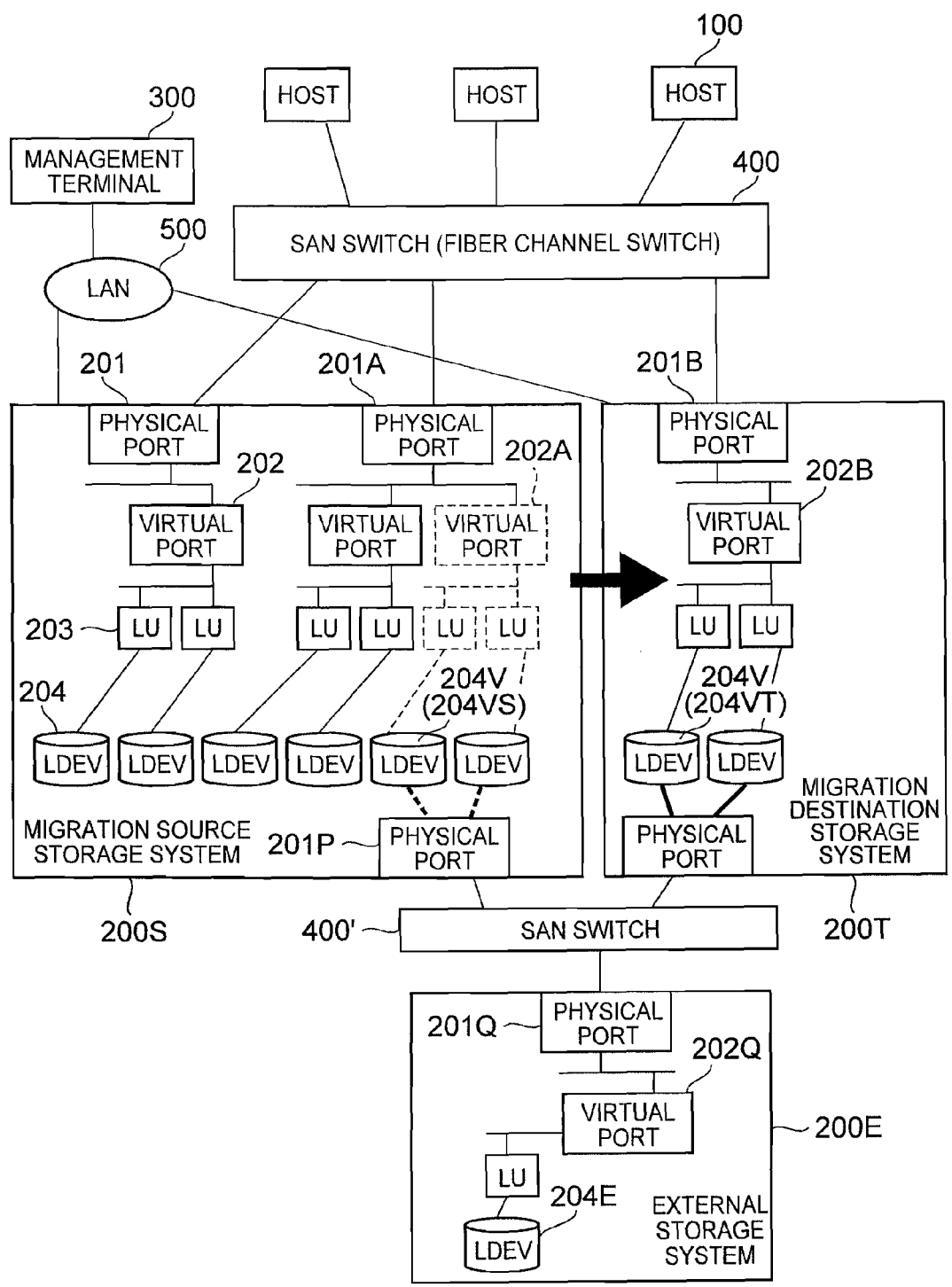
FIG. 17 shows the constitution of a computer system according to a third embodiment of the present invention.

FIG. 17 shows the constitution of the computer system according to the third embodiment of the present invention.

A plurality of storage systems include an external storage system 200E in addition to the migration source storage system 200S and the migration destination storage system 200T. The external storage system 200E is also one type of storage system which has an NPIV function. Hence, one or a plurality of virtual ports 202 are also added to the physical port 201 in the external storage system 200E, one or a plurality of LU 203 are associated with each virtual port 202, and the LDEV 204 is associated with each LU 203.

The migration source storage system 200S has virtual LDEV 204V in addition to LDEV ("real LDEV" hereinbelow) 204R which are formed on the basis of one or more PDEV 212. The virtual LDEV 204V is an LDEV which is formed on the basis of one or a plurality of real LDEV 204E in an external storage system 200E. The virtual LDEV 204V of the migration source storage system 200S is called an "externally connected LDEV 204V" and the real LDEV of the external storage system which correspond with externally connected LDEV 204V are called "external LDEV." The external LDEV 204E exist as externally connected LDEV 204V in the migration source storage system 200S in accordance with storage virtualization technology. The external LDEV 204E and externally connected LDEV 204V may correspond either one to one, one to many, or many to one. A constitution in which the external LDEV 204E of the external storage system 200E exist in the storage system as externally connected LDEV 204V is sometimes called an "externally connected constitution" hereinbelow.

In the third embodiment, as per the second embodiment, the virtual port 202 and all of the LDEV that belong to the virtual port 202 (the LDEV which belong to all of the LU path definitions which have the virtual port) migrate from the migration source storage system 200S to the migration destination storage system 200T. However, if the migration source LDEV and migration destination LDEV are externally connected LDEV 204V, unlike the second embodiment, it is not necessary to copy the data from the migration source LDEV to the migration destination LDEV. This is because the migration source LDEV and the migration destination LDEV which constitutes the LDEV pair are associated with the external LDEV 204E which corresponds with the migration source LDEV. That is, this is because the data in the migration source LDEV and migration destination LDEV remain actually stored in the same external LDEV 204E.

In the example of FIG. 17, the external storage system 200E is connected to a SAN switch 400' which is separate from the SAN switch 400 to which the host computer 100 is connected and the migration source storage system 200S and migration destination storage system 200T are connected to the separate SAN switch 400'. However, the constitution is not limited thereto. For example, the separate SAN switch 400' may also be omitted. In this case, the external storage system 200E is connected to the SAN switch 400 to which the host computer 100 is connected.

Furthermore, in the example of FIG. 17, the external storage system 200E has an NPIV function but need not have an NPIV function. In this case, the external LDEV 204E can be accessed by transmitting an access command that designates the port ID and LUN of the physical port 201 to the external storage system 200E.

In the third embodiment, externally connected LDEV constitution information is required.

FIG. 18 shows the constitution of externally connected LDEV constitution information.

Externally connected LDEV constitution information 1100 is prepared for each of the externally connected LDEV 204V. Information elements which are contained in the externally connected LDEV constitution information 1100 include, for example, an external LDEV number 1101, an initiator port ID 1102, an external storage port ID 1103, and an external storage LUN 1104.

The externally connected LDEV number 1101 is a number serving to identify the externally connected LDEV 204V within the storage system.

The initiator port ID 1102 is the port ID of the transmission source physical port (called the "initiator port" in the description of the third embodiment hereinbelow) 201P which transmits a command to the external storage system 200E.

The external storage port ID 1103 is the port ID of the virtual port 202Q of the external storage system 200E (known as the "external storage port 202Q" in the description of the third embodiment hereinbelow) which receives commands from the initiator port 201P. If there is no virtual port 202Q, the physical port 201Q becomes the external storage port that receives commands from the initiator port 201P.

The external storage LUN 1104 is the LUN of the LU in the external storage system 200E which is associated with the external LDEV 204E.

In cases where an access command designating the externally connected LDEV 204V is received from the host computer 100, the SCSI command processing module of the migration source storage system 200S creates an access command designating the external LDEV 204E which corresponds with the externally connected LDEV 204V (an access command which comprises an external storage port ID and external storage LUN which correspond with the externally connected LDEV 204V) and transmits the access command from the initiator port 201P which corresponds with the externally connected LDEV 204V. The external storage system 200E receives the access command transmitted from the initiator port 201P via the external storage port 202Q and processes the received access command.

Figure 19:
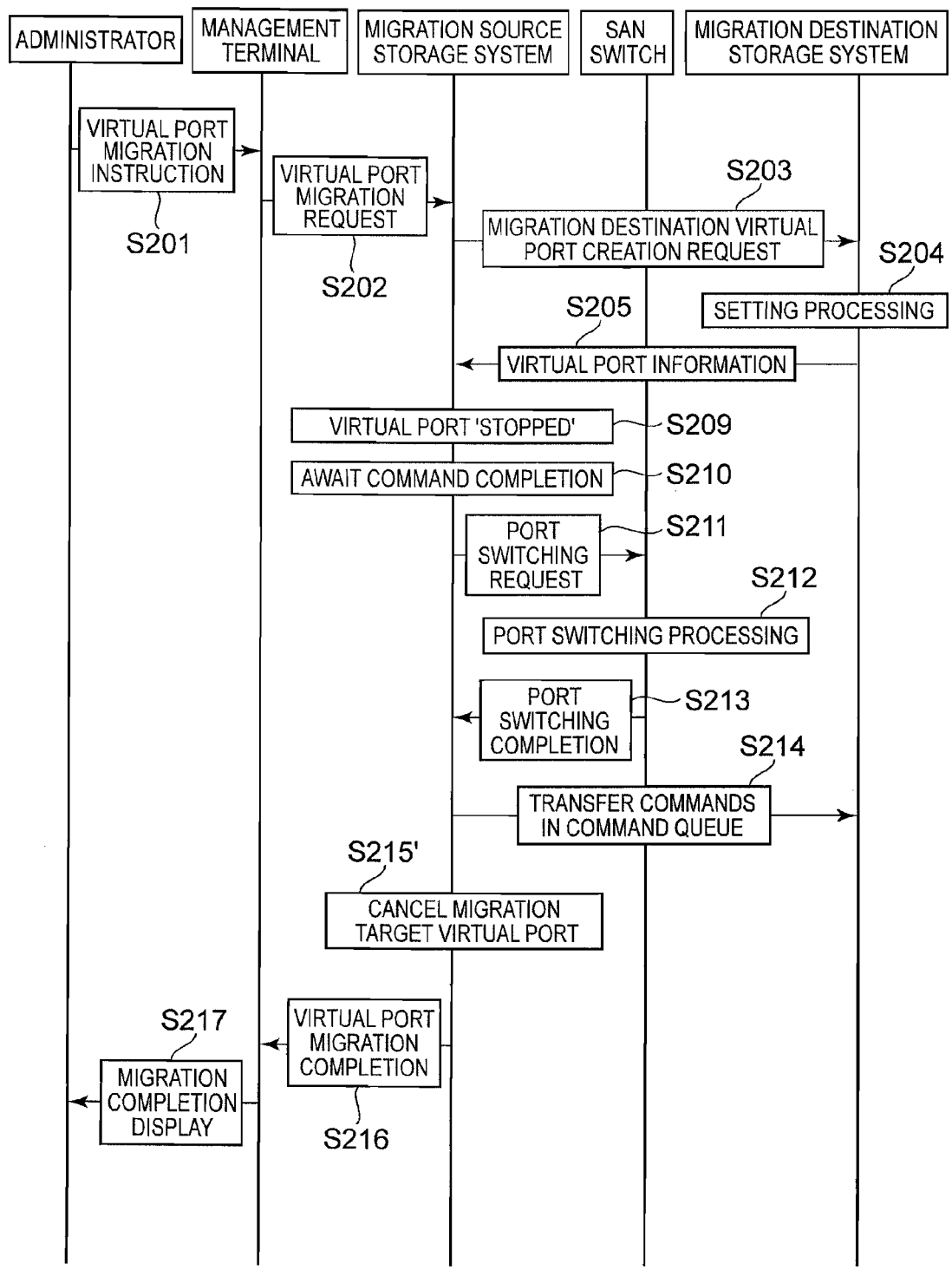
FIG. 19 shows the flow of processing that is performed by the computer system according to the third embodiment.

FIG. 19 shows the flow of processing that is executed by the computer system according to the third embodiment.

The flow of the processing shown in FIG. 19 is substantially a process flow obtained by removing steps 206, 207, and 208 from the flow shown in FIG. 15. Furthermore, at least one of the remaining steps 201 to 205 and 209 to 217 is changed.

For example, in step 203, the virtual port switching processing module of the migration source storage system 200S also transmits the externally connected LDEV information 1100 which corresponds with each externally connected LDEV 204VS belonging to the migration target virtual port 202A to the migration destination storage system 200T.

In step 204, in the migration destination storage system 200T, the external storage port ID 1103 and external storage LUN 1104 of the externally connected LDEV information 1100 which corresponds with the migration source externally connected LDEV 204VS are copied to the externally connected LDEV information 1100 which corresponds with the externally connected LDEV 204VT assigned as a migration destination LDEV. As a result, the external LDEV 204E which corresponds with the migration source externally connected LDEV 204VS is associated with the migration destination externally connected LDEV 204VT.

In step 215', cancellation of the migration target virtual port 202A is carried out but the deletion of the pair information is not required.

The third embodiment was described hereinabove. The externally connected constitution can also be applied to the first embodiment. Further, in the third embodiment, as illustrated in FIG. 16, for example, the switch controller number which corresponds with the port ID of the migration target virtual port 202A in the routing table 900 can be changed to the number of the switch controller which corresponds with the switch port connected to the migration destination physical port by transmitting a login request from the migration destination physical port.

According to the third embodiment, the virtual ports 202 and the externally connected LDEV which belong to the virtual ports 202 migrate from the migration source storage system 200S to the migration destination storage system 200T. As a result, in the externally connected constitution, the load on the migration source storage system 200S (more specifically, the load on the physical port 201 to which the migration target virtual port belongs and the load on the storage processor of the migration source storage system) can be alleviated. Furthermore, the migration of the virtual port 202 and externally connected LDEV 204V between the storage systems 200S and 200T can be performed without stopping the host computer 100.

Preferred embodiments of the present invention were illustrated hereinabove for the purpose of explaining the present invention but there is no intention to limit the scope of the present invention to these embodiments. The present invention can be carried out in a variety of other forms.

For example, a plurality of SAN switches 400 which are connected to one or more host computers 100 and one or more storage systems 200 may exist. In this case, all of the routing tables in all of the SAN switches 400 can be updated as a result of communication by the SAN switch 400.

In addition, for example, the routing tables may comprise the switch processors 408 instead of the switch controllers 413 each having the switch processors 408.

The flow of the processing that appears in at least one of FIGS. 7 to 9, 10 and 11, 15 and 16, and 19 provides an overview of each process to the extent required to understand and implement the present invention. Hence, a person skilled in the art is able to change the order of the steps or change the steps to other steps and so forth to an extent that does not depart from the scope of the present invention.

What is claimed is:

1. A computer system, comprising:
a storage system:
a switching unit coupled to the storage system; and
a management terminal;
the storage system comprising:
first and second physical ports;
multiple virtual ports which are associated with the first physical port, and for which different WWNs (World Wide Names) are configured, respectively; and
multiple logical devices which are associated with the multiple virtual ports;
the switching unit comprising:
a first switching port coupled to the first physical port;
a second switching port coupled to the second physical port; and
a processor which, upon receiving a login request from the first physical port, the login request for each of the multiple virtual ports of a WWN:
allocates different port identifiers (IDs) to the multiple virtual ports;
creates login information which associates the WWN with the port ID and the first switching port; and
creates routing information which associates the port ID with the first switching port;
wherein in a case where a physical port associated with a transfer-target virtual port, which is one of the multiple virtual ports, has been transferred from the first physical port to the second physical port, the storage system sends the login request from the second physical port to the switching unit, the login request including the WWN configured for the transfer-target virtual port;
upon receiving the login request via the second switching port, the processor of the switching unit:
changes the switching port associated with the WWN configured for the transfer-target virtual port in the login information from the first switching port to the second switching port; and
changes the switching port associated with the port ID configured for the transfer-target virtual port in the routing information from the first switching port to the second switching port;
the management terminal:
acquires information related to a utilization status of the first physical port from the storage system;
in a case where a determination is made that the first physical port is in an overload state based on the acquired information, instructs the storage system to transfer the transfer-target virtual port from the first physical port to the second physical port;
acquires, from the storage system, information related to a utilization status of each of the multiple virtual ports associated with the first physical port; and
selects a virtual port with a highest load of the multiple virtual ports as the transfer-target virtual port; and
the storage system sends a login request from the second physical port to the switching unit, the login request including the WWN configured for the transfer-target virtual port.

2. A computer system, comprising:
first and second storage systems;
a switching unit coupled to the first and second storage systems; and
a management terminal;
the first storage system comprising:
a first physical port;
multiple virtual ports which are associated with the first physical port, and for which different WWNs (World Wide Names) are configured, respectively; and
multiple logical devices which are associated with the multiple virtual ports;
the second storage system comprising:
a second physical port; and
a logical device;
the switching unit comprising:
a first switching port coupled to the first physical port;
a second switching port coupled to the second physical port; and a processor which, upon receiving a login request from the first physical port, the login request for each of the multiple virtual ports of a WWN:
  allocates different port identifiers (IDs) to the multiple virtual ports;
  creates login information which associates the WWN with the port ID and the first switching port; and
  creates routing information which associates the port ID with the first switching port;
wherein in a case where a physical port associated with a transfer-target virtual port, which is one of the multiple virtual ports, has been transferred from the first physical port to the second physical port, the first storage system sends information for identifying the WWN configured for the transfer-target virtual port, the virtual port ID, and the second physical port associated with the transfer-target virtual port to the second storage system;
the second storage system:
  configures information of the transfer-target virtual port in association with the second physical port; and
  associates the logical device of the second storage system with the transfer-target virtual port associated with the second physical port;
the first storage system copies data of a logical device associated with the transfer-target virtual port of the first storage system to the logical device of the second storage system;
the second storage system sends a login request from the second physical port to the switching unit, the login request including the WWN configured for the transfer-target virtual port;
upon receiving the login request via the second switching port, the processor of the switching unit:
  changes the switching port associated with the WWN configured for the transfer-target virtual port in the login information from the first switching port to the second switching port; and
  changes the switching port associated with the port ID configured for the transfer-target virtual port in the routing information from the first switching port to the second switching port;
the management terminal:
  acquires information related to a utilization status of the first physical port from the storage system;
  in a case where a determination is made that the first physical port is in an overload state based on the acquired information, instructs the storage system to transfer the transfer-target virtual port from the first physical port to the second physical port;
  acquires, from the storage system, information related to the utilization status of each of the multiple virtual ports associated with the first physical port; and
  selects a virtual port with a highest load of the multiple virtual ports as the transfer-target virtual port; and
the storage system sends a login request from the second physical port to the switching unit, the login request including the WWN configured for this transfer-target virtual port.

3. A method for transferring a virtual port, comprising:
configuring multiple virtual ports by a storage system, wherein the multiple virtual ports are associated with a first physical port, and to which different WWNs (World Wide Names) are allocated, respectively;
associating multiple logical devices with the multiple virtual ports by the storage system;
upon receiving a login request from the first physical port, the login request for each of the multiple virtual ports of a WWN, a switching unit:
  allocating different port identifiers (IDs) to the multiple virtual ports;
  creating login information which associates the WWN with the port ID and a first switching port in the switching unit; and
  creating routing information which associates the port ID with the first switching port;
in a case where a physical port associated with a transfer-target virtual port, which is one of the multiple virtual ports, has been transferred from the first physical port to a second physical port, sending a login request from the second physical port of the storage system to the switching unit, the login request including the WWN configured for the transfer-target virtual port;
upon receiving the login request via the second switching port in the switching unit, the switching unit changing the switching port associated with the WWN configured for the transfer-target virtual port in the login information from the first switching port to the second switching port;
the switching unit changing the switching port associated with the port ID configured for the transfer-target virtual port in the routing information from the first switching port to the second switching port;
acquiring information related to a utilization status of the first physical port from the storage system by a management terminal;
in a case where a determination is made that the first physical port is in an overload state based on the acquired information, the management terminal instructing the storage system to transfer the transfer-target virtual port from the first physical port to the second physical port;
acquiring, by the management terminal from the storage system, information related to the utilization status of each of the multiple virtual ports associated with the first physical port;
selecting, by the management terminal, a virtual port with a highest load of the multiple virtual ports as the transfer-target virtual port; and
sending a login request from the second physical port of the storage system to the switching unit, the login request including the WWN configured for this transfer-target virtual port.

4. A method for transferring a virtual port, comprising:
configuring multiple virtual ports by a first storage system, wherein the multiple virtual ports are associated with a first physical port of the first storage system, and to which different WWNs (World Wide Names) are allocated, respectively;
associating multiple logical devices with the multiple virtual ports by the first storage system;
upon receiving a login request from the first physical port, the login request for each of the multiple virtual ports of a WWN, a switching unit:
  allocating different port identifiers (IDs) to the multiple virtual ports;
  creating login information which associates the WWN with the port ID and a first switching port in the switching unit; and
  creating routing information which associates the port ID with the first switching port;
in a case where a physical port associated with a transfer-target virtual port, which is one of the multiple virtual ports, has been transferred from the first physical port to a second physical port of a second storage system, sending information for identifying the WWN configured for the transfer-target virtual port, the virtual port ID, and the second physical port associated with the transfer-target virtual port from the first storage system to the second storage system;

the second storage system:
configuring information of the transfer-target virtual port in association with the second physical port; and
associating the logical device of the second storage system with the transfer-target virtual port associated with the second physical port;

the first storage system copying data of a logical device associated with the transfer-target virtual port of the first storage system to the logical device of the second storage system;

the second storage system sending a login request including the WWN configured for the transfer-target virtual port from the second physical port to the switching unit;

upon receiving the login request via the second switching port, the switching unit:
changing the switching port associated with the WWN configured for the transfer-target virtual port in the login information from the first switching port to the second switching port; and
changing the switching port associated with the port ID configured for the transfer-target virtual port in the routing information from the first switching port to the second switching port;

acquiring information related to a utilization status of the first physical port from the first storage system by a management terminal;

in a case where a determination is made that the first physical port is in an overload state based on the acquired information, the management terminal instructing the first storage system to transfer the transfer-target virtual port from the first physical port to the second physical port;

acquiring, by the management terminal from the storage system, information related to the utilization status of each of the multiple virtual ports associated with the first physical port;

selecting, by the management terminal, a virtual port with a highest load of the multiple virtual ports as the transfer-target virtual port; and sending a login request from the first storage system to the switching unit, the login request including the WWN configured for this transfer-target virtual port from the second physical port.

* * * * *